(12) United States Patent
Glugla et al.

(10) Patent No.: US 11,174,805 B2
(45) Date of Patent: Nov. 16, 2021

(54) SPLIT LAMBDA FUELING OPERATION SYSTEMS AND METHODS

(71) Applicant: Ford Global Technologies, LLC, Dearborn, MI (US)

(72) Inventors: Chris Paul Glugla, Macomb, MI (US); Rani Kiwan, Dearborn, MI (US); Joseph Lyle Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/839,694

(22) Filed: Apr. 3, 2020

(65) Prior Publication Data
US 2021/0310434 A1 Oct. 7, 2021

(51) Int. Cl.
| | |
|---|---|
| *F01N 3/00* | (2006.01) |
| *F02D 41/14* | (2006.01) |
| *F02D 41/38* | (2006.01) |
| *F01N 13/10* | (2010.01) |
| *F01N 3/10* | (2006.01) |
| *F01N 3/021* | (2006.01) |

(52) U.S. Cl.
CPC ......... *F02D 41/1454* (2013.01); *F01N 3/021* (2013.01); *F01N 3/101* (2013.01); *F01N 13/107* (2013.01); *F02D 41/38* (2013.01)

(58) Field of Classification Search
CPC .... F02D 41/1454; F02D 41/38; F01N 13/107; F01N 3/021; F01N 3/101
See application file for complete search history.

(56) References Cited

U.S. PATENT DOCUMENTS

| | | | |
|---|---|---|---|
| 4,106,448 A | 8/1978 | Noguchi et al. | |
| 6,467,259 B1 * | 10/2002 | Surnilla | F01N 3/0842 60/274 |

(Continued)

FOREIGN PATENT DOCUMENTS

| | | |
|---|---|---|
| GB | 2350206 A | 11/2000 |
| JP | H09158759 A | 6/1997 |

OTHER PUBLICATIONS

Glugla, C. et al., "Split Lambda Fueling Operation Systems and Methods," U.S. Appl. No. 16/839,705, filed Apr. 3, 2020, 113 pages.

(Continued)

*Primary Examiner* — Matthew T Largi
(74) *Attorney, Agent, or Firm* — Geoffrey Brumbaugh; McCoy Russell LLP

(57) ABSTRACT

Methods and systems for operating an engine with split lambda modes are provided. At least one example method comprises, while operating an engine in a condition that is within a resonant frequency region for a default split lambda mode, carrying out a rolling split lambda mode. The engine may be operated with only stoichiometric engine cycles in the default split lambda mode, the stoichiometric engine cycles including enleaned and enriched cylinders. Further, the engine may be operated with a plurality of non-stoichiometric engine cycles when carrying out the rolling split lambda mode, the plurality of non-stoichiometric engine cycles including at least one rich engine cycle and at least one lean engine cycle.

19 Claims, 10 Drawing Sheets

(56) References Cited

U.S. PATENT DOCUMENTS

| | | | | |
|---|---|---|---|---|
| 6,735,937 | B2* | 5/2004 | Sumilla | F02D 41/025 |
| | | | | 60/274 |
| 6,799,421 | B2 | 10/2004 | Surnilla | |
| 7,934,487 | B2* | 5/2011 | Santoso | F02D 41/0082 |
| | | | | 123/435 |
| 10,174,699 | B2* | 1/2019 | Suzuki | F02D 41/0295 |
| 2006/0080951 | A1* | 4/2006 | Pott | F01N 13/009 |
| | | | | 60/274 |
| 2006/0162321 | A1* | 7/2006 | Zillmer | F01N 3/0842 |
| | | | | 60/295 |
| 2010/0037856 | A1* | 2/2010 | Dickerson | F02M 26/71 |
| | | | | 123/323 |
| 2010/0212294 | A1* | 8/2010 | Narayanaswamy | |
| | | | | F02D 41/0255 |
| | | | | 60/285 |
| 2018/0244274 | A1* | 8/2018 | Katayama | B60W 10/026 |

OTHER PUBLICATIONS

Thomas, J. et al., "Split Lambda Fueling Operation Systems and Methods," U.S. Appl. No. 16/839,716, filed Apr. 3, 2020, 111 pages.

* cited by examiner

SPLIT LAMBDA FUELING OPERATION SYSTEMS AND METHODS

FIELD

The present description relates generally to methods and systems for controlling a vehicle engine with split lambda fueling operations.

BACKGROUND/SUMMARY

Modern engines are operated with a substantially stoichiometric air fuel ratio over a large portion of an engine speed-load map to maintain emission control device efficiency and meet emissions requirements. However at higher engine speeds and loads, typically the fuel will be scheduled rich of stoichiometry to cool a catalyst of the emission control device, as excess unburned fuel may help to cool the engine and exhaust components. For example, in gasoline turbocharged direct injection (GTDI) engines, the turbo inlet temperature is typically the hottest component and must be controlled to stay below a maximum allowable temperature to prevent operation problems. However, when the engine is operated rich to enable such cooling, hydrocarbon (HC) and carbon monoxide (CO) emissions may increase, and there is an associated increase in fuel consumption. Other attempts to address such emissions and fuel consumption issues have included operating the engines at stoichiometry over all conditions to avoid the HC and CO emission increase associated with enrichment operation. Additionally or alternatively, load limit operations may be carried out, such as limiting an engine speed, airflow, and torque output so that these cooling operations are not necessary. Another proposed solution has been to carry out a split lambda fuel control scheme. In a split lambda fuel control scheme, fuel delivery to the cylinders is enrichened or enleaned from stoichiometry while maintaining substantially stoichiometric conditions at the emission control device, so that emissions are avoided and exhaust temperatures are reduced without sacrificing engine performance. In some of these proposed split lambda fuel control schemes, strategies such as providing exhaust gas recirculation (EGR) to an intake passage of the engine from a subset of the cylinders has been proposed. In this way, engine power output may be increased by partially enriching the engine without increasing vehicle emissions.

However, the inventors have recognized that the above strategies have several shortcomings, especially concerning maintaining engine performance while avoiding noise, vibration, and harshness (NVH).

For example, previous approaches of operating the engine at stoichiometry over all conditions and load limiting strategies severely reduce engine performance. Further, previous default split lambda approaches may result in pronounced NVH issues if the engine is operated at a speed and load where the default split lambda pattern excites the resonance frequency and causes amplification of frequencies excited by the split lambda fueling pattern due to resonance. As to previous split lambda control schemes, the complex fueling strategy may create issues concerning accurately calculating a torque output. If the torque output is not being accurately determined, engine performance may be reduced and NVH may occur. Moreover, these previous split lambda schemes also fail to address issues of reducing NVH due to resonance amplification, and the above-discussed EGR strategy has little impact on increasing engine power.

In one example, the issues described above may be addressed by methods that may include carrying out a plurality of non-stoichiometric engine cycles while maintaining substantially stoichiometric conditions at an emission control device. By allowing non-stoichiometric engine cycles, additional fueling schedules with different frequencies (of repeating patterns of rich and lean cylinders) compared to those of stoichiometric engine cycles (with at least one rich or lean cylinders) are possible. In this way, NVH issues may be mitigated by choosing a fueling schedule that avoids exciting the engine or powertrain resonant frequencies while maintaining engine performance and reducing emissions. The optimal fueling schedule may vary based on engine speed and load conditions. Furthermore, the rolling split lambda may be used instead of default split lambda whenever split lambda operation is required to enable higher torques, and the rolling split lambda improves NVH compared to default split lambda, and/or the rolling split lambda enables higher engine torques.

Such an approach as developed by the inventors may be advantageous for several reasons. For example, consider a 6 cylinder engine. Alternating cylinders rich (R) and lean (L), each with equal rich and lean biases such as 20% each, results in a default split lambda as the cycle RLRLRL or LRLRLR is stoichiometric. The shortest repeating pattern (RL or LR) thus has a frequency three times the cycle frequency. Therefore, if, for example, a resonant frequency at 3000 RPM is close to three times the cycle frequency, the default split lambda may cause undesirable NVH. A rolling split lambda where cylinder duplets alternate rich and lean RRLLRR-LLRRLL has a shortest pattern of RRLL or RLLR or LLRR or LRRL, repeating at 1.5 times the cycle frequency which avoids the resonant frequency. However, if the engine speed changes to 6000 RPM, the resonant frequency now is at 1.5 times the cycle frequency. Therefore, a default split lambda may be better for NVH at this condition.

Having a rolling split lambda option may allow split lambda operation in regions where it was not possible with default split lambda (as the only split lambda mode) due to NVH. But this doesn't necessarily mean that rolling split lambda is better for NVH and avoiding amplification due to resonance everywhere. Further, having the rolling split lambda option may thus allow split lambda operation in speed-load regions where it was not possible with default split lambda as the only split lambda mode due to NVH. Thus, improvements over previous split lambda approaches may be achieved.

Further, as another example, consider a 3 cylinder engine. Due to the odd number of cylinders, a default split lambda mode is only possible with unequal rich and lean biases (for example, a 20% rich first cylinder, a 10% lean second cylinder, and a 10% lean third cylinder), or with running one cylinder stoichiometric (for example a 20% rich first cylinder, a stoichiometric second cylinder, a 20% lean third cylinder). A 10% bias or 0% bias from stoichiometric as in the default split lambda mode results in higher exhaust temperatures than a 20% bias from stoichiometric in the rolling split lambda mode. Thus, the rolling split lambda mode described herein with alternating 20% rich and 20% lean biases can further advantageously reduce exhaust temperatures and allow higher torques.

Further, the issues described above may additionally or alternatively be addressed by methods for calculating a torque output based on one or more torque modifiers, the one or more torque modifiers including an air fuel ratio and spark timing. In particular, during a split lambda fueling mode, the torque output calculations may include calculating the torque output for each cylinder separately and then summing the torque outputs. As another example, during a split lambda fueling mode, the torque output of all lean cylinders may be calculated as a first group, the torque output of all rich cylinders may be separately calculated as a second group, and then the torque output of the first group and the second group may be summed. Such an approach to calculating the torque output may help to ensure accuracy during split lambda fueling modes, such as the default split lambda mode and the rolling split lambda mode discussed below.

Further, in addition to or as an alternative, the issues described above may be addressed by a method for operating an engine with at least one rich cylinder and at least one lean cylinder, where the at least one rich cylinder is fueled via port fuel injection (PFI) and the at least one lean cylinder is fueled via direct injection. By fueling the at least one rich cylinder via PFI and the at least one lean cylinder via DI, components may be prevented from overheating while improving engine torque output performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
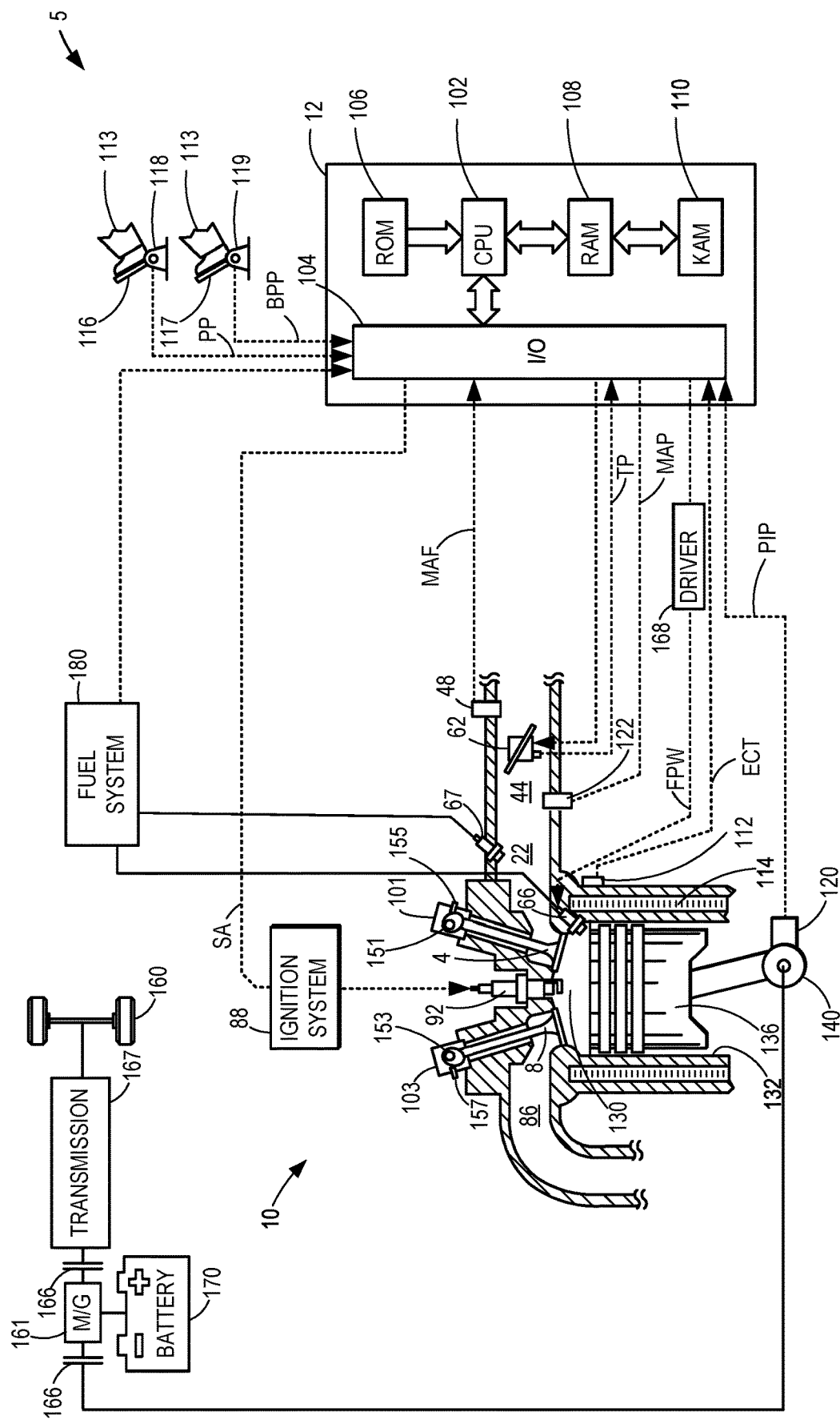
FIG. 1 shows an embodiment of a cylinder that may be included in an engine system according to at least one example of the present disclosure.

The following description relates to systems and methods for operating a vehicle engine with split lambda fueling. In at least one example, the vehicle systems described herein may include one or more of the configurations as described at FIGS. 1-4. In at least one example, the approach described herein may include operating the vehicle engine in accordance with one or more of the strategies as described at FIG. 5 and at FIGS. 10A-10B. That is, the approach described herein may include transitioning the vehicle engine operation between a stoichiometric mode, a default split lambda mode, and a rolling split lambda mode. Transitioning between the stoichiometric mode, default split lambda mode, and rolling split lambda mode first includes operating in the stoichiometric mode, so long as the stoichiometric mode does not result in exhaust temperatures greater than a threshold. Otherwise, if operating in the stoichiometric mode results in the exhaust temperatures being greater than the threshold, the engine is operated in one of the split lambda modes, which include the default split lambda mode and the rolling split lambda mode.

If the engine is to be operated in the split lambda mode, the method includes determining whether to operate in the default split lambda mode or the rolling split lambda mode, depending on which split lambda mode (default or rolling) is better for NVH and exhaust temperature reduction. For example, predictive calculations may be carried out to predict the impact of operating in the default split lambda mode and the rolling split lambda mode on NVH and exhaust temperature, and the ideal split lambda mode for exhaust temperature reduction and avoiding NVH while still achieving torque demands may be selected. That is, vehicle engine operation may be transitioned between various modes based on impacts of operating the engine in that mode on one or more of NVH, exhaust temperature, and engine torque. In at least one example, evaluating whether or not operation in one of the engine modes will lead to NVH may be based at least in part on a resonant frequency condition, the resonant frequency condition based on a speed and load of the engine. That is, each of the operating modes may have a separate resonant frequency region of a speed-load map of the engine at which greater than a threshold amount of NVH occurs. Thus, selection and operation of the engine in one of the stoichiometric mode, default split lambda mode, and rolling split lambda mode may take into account the engine speed and load conditions, in at least one example.

It is noted that reference to an engine cycle herein refers to one complete engine cycle, where a single combustion of each of the cylinders of the engine has occurred. In the rolling split lambda mode, a plurality of engine cycles are carried out, with at least one engine cycle being a rich engine cycle and at least one engine cycle being a lean engine cycle of the plurality of engine cycles. These rich and lean engine cycles beneficially help to reduce NVH by allowing fueling schedules that avoid exciting the engine resonant frequency. As explained at least at FIGS. 8A-8D, a fuel schedule of the plurality of engine cycles in the rolling split lambda mode still averages to be substantially stoichiometric, so that substantially stoichiometric conditions are maintained at an emission control device downstream of the engine cylinders over the plurality of engine cycles. It is noted that substantially stoichiometric refers an air-fuel-ratio being substantially near a lambda value of 1.0. For example, substantially stoichiometric may include lambda values between 0.95 to 1.05. The rolling split lambda mode is in contrast with the default split lambda mode. Whereas the rolling split lambda mode includes engine cycles which are non-stoichiometric, each engine cycle in the default split lambda mode is operated to achieve stoichiometry, as discussed at FIGS. 9A-9D. Moreover, as described at FIG. 5 and at FIGS. 10A-10B, carrying out the default split lambda mode and the rolling split lambda mode may include fueling the rich cylinders with PFI and the lean cylinders with DI, in at least one example. By fueling the rich cylinders with PFI and the lean cylinders with DI, advantageous cooling effects may be achieved while maintaining engine torque output performance.

Figure 5:
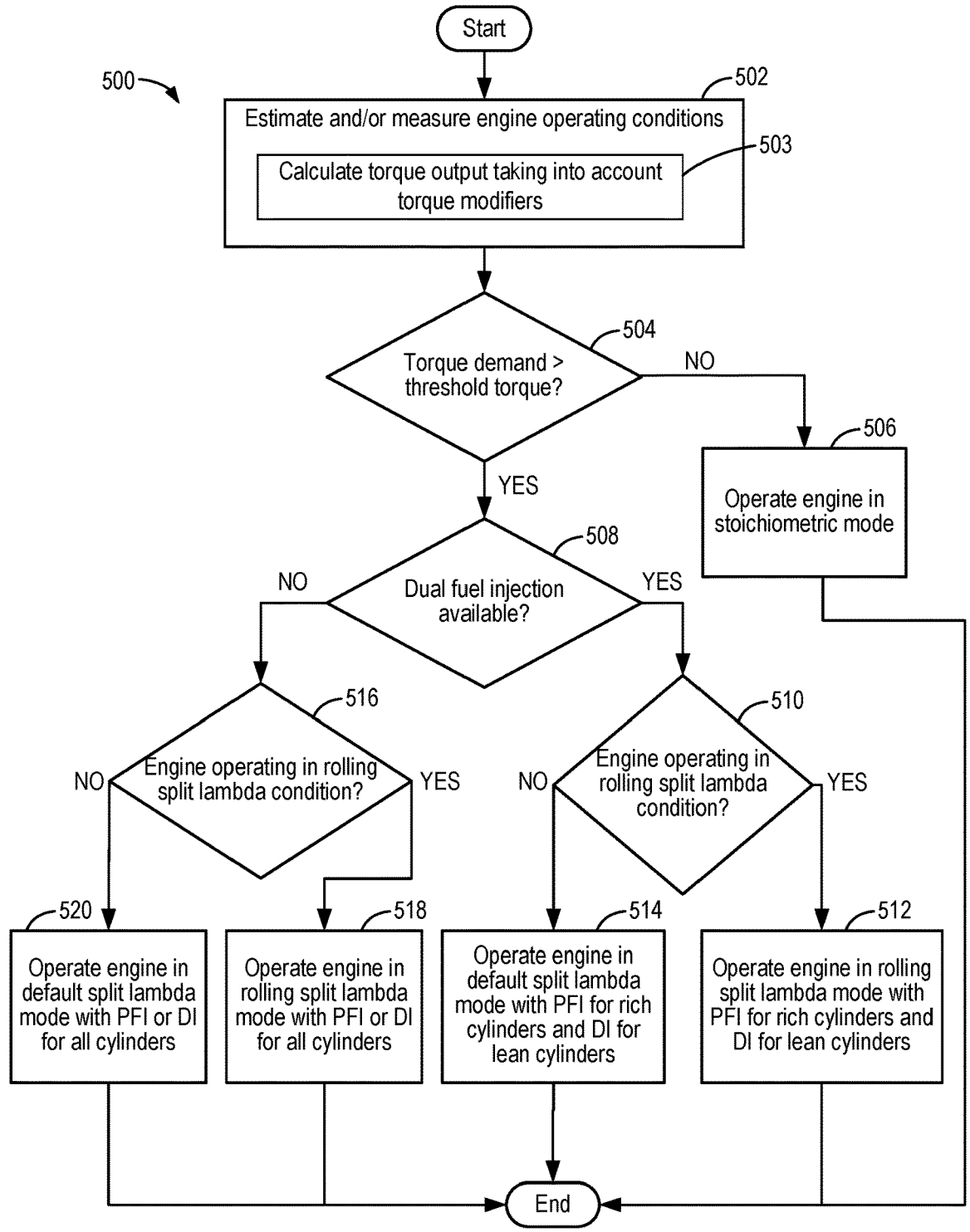
FIG. 5 shows a flow chart of an operational method according to at least one example of the present disclosure.
Figure 10B:
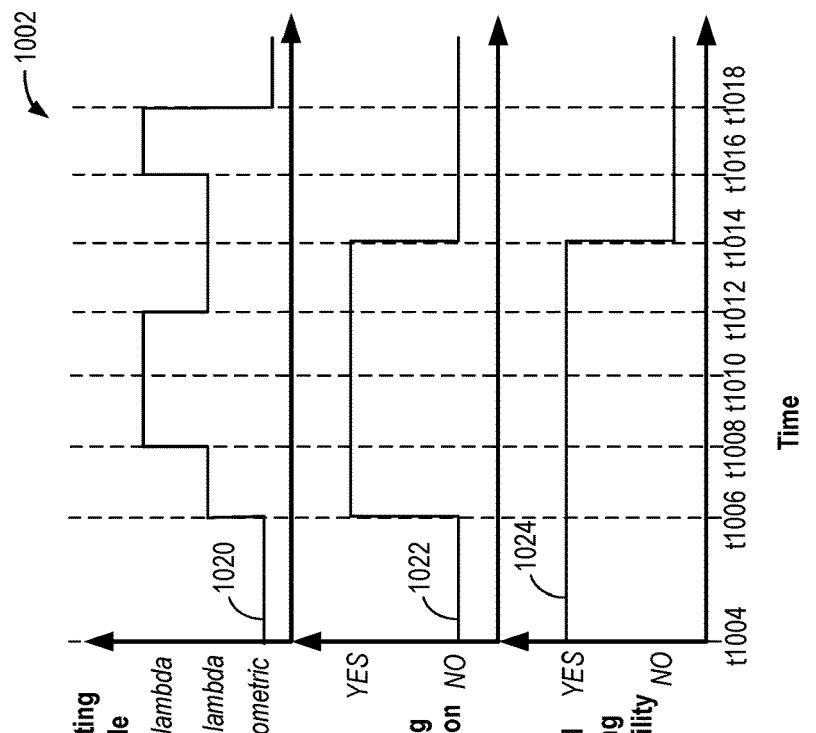
FIG. 10B shows an example timeline for adjusting engine operation to transition between various operating modes, including a stoichiometric mode, a rolling split lambda mode, and a default split lambda mode taking into account the speed-load-operating mode map of FIG. 10A.
Figure 10A:
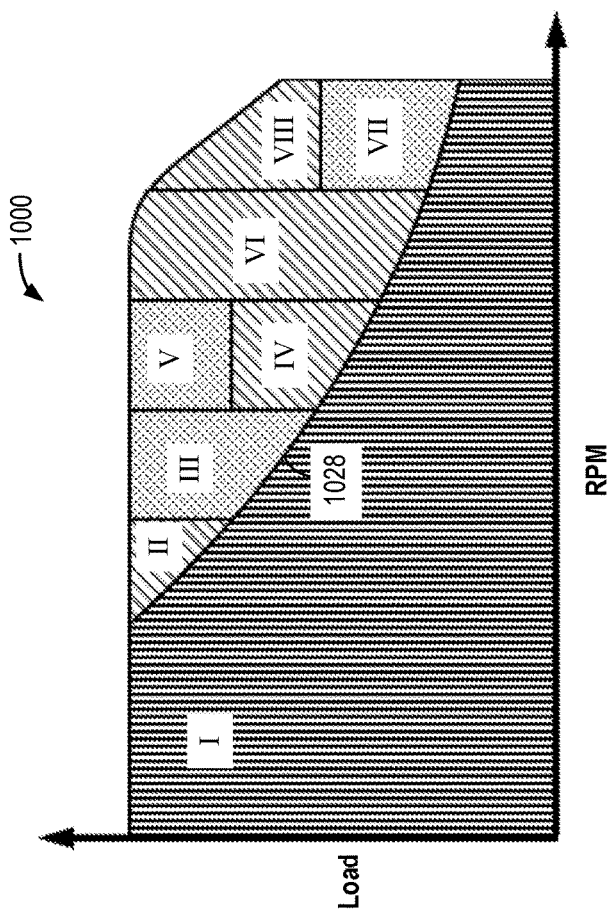
FIG. 10A shows an example speed-load-operating mode map, according to at least one example of the present disclosure.

As further described at FIG. 5 and FIGS. 10A-10B, transitioning the engine operation between stoichiometric, default split lambda, and rolling split lambda modes may include calculating a torque output of the engine based on one or more torque modifiers. These torque output calculations may include individually calculating the torque output of each cylinder or virtually grouping the cylinders into a rich cylinder group and a lean cylinder group to perform the calculations. As discussed at FIG. 6 and at FIG. 7, spark timing adjustments and air-fuel ratio adjustments are two types of torque modifiers that impact a torque output of the cylinders. By taking into account these torque modifiers in the manner as described at FIG. 5, increased accuracy and efficiency in calculating the torque output may result.

Turning now to the figures, FIG. 1 shows a partial view of a single cylinder 130 of an internal combustion engine 10 that may be included in a vehicle 5. Internal combustion engine 10 may be a multi-cylinder engine, and different engine system configurations for engine 10 will be described below with respect to FIGS. 2-4. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including fuel injector 66. Fuel injector 66 is a direct injector that is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 positioned to the side, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to help improve mixing. Further, in at least one example, each cylinder of engine 10 may further include a port fuel injector 67 that provides fuel into the intake port upstream of cylinder 130.

Fuel may be delivered to fuel injector 66 and port fuel injector 67 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 5.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle. Electric machine 161 receives electrical power from a battery 170 to provide torque to vehicle wheels 160. Electric machine 161 may also be operated as a generator to provide electrical power to charge battery 170, for example during a braking operation.

Figure 2:
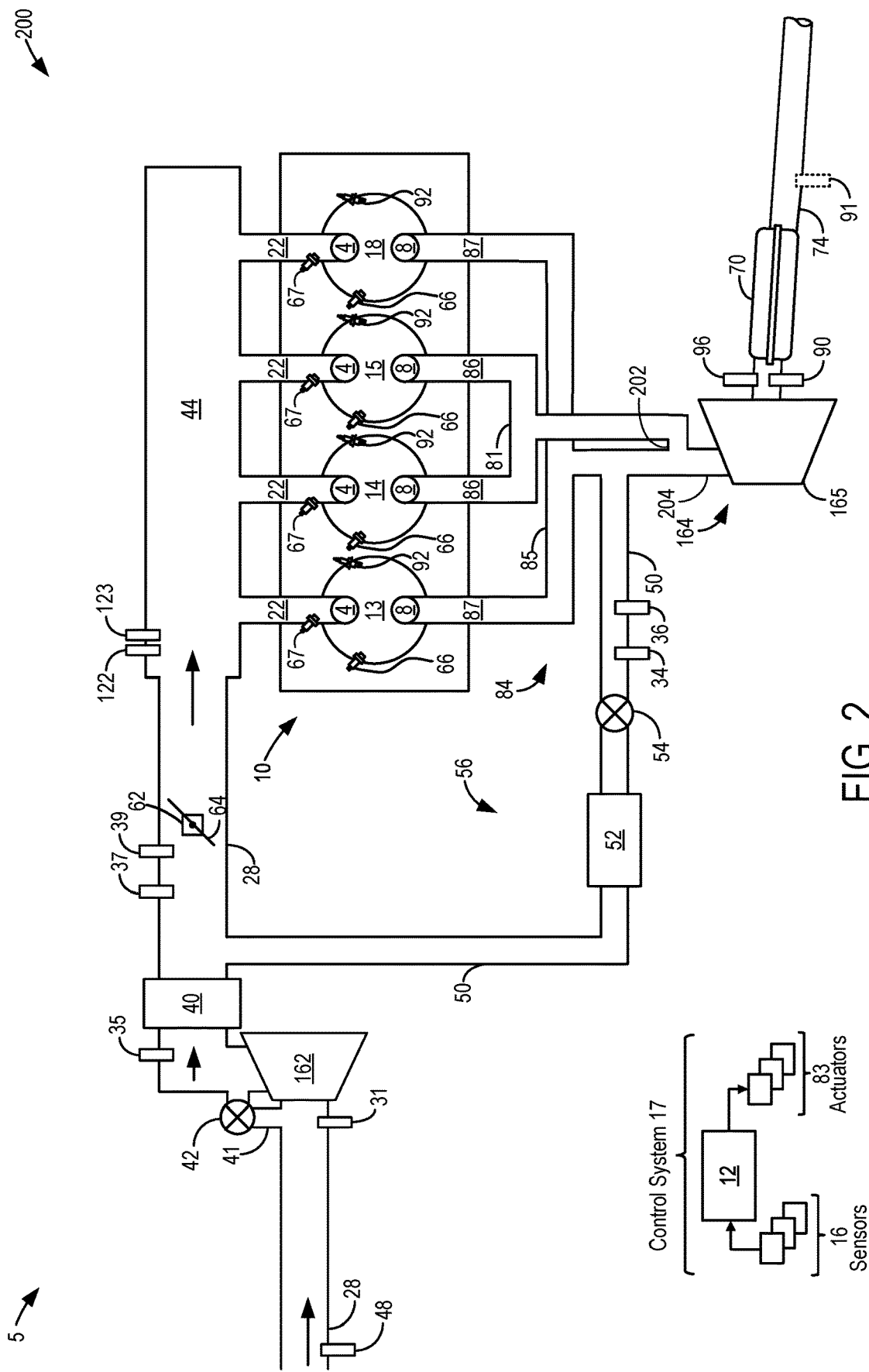
FIG. 2 shows a schematic depiction of a first example of an engine system.

As mentioned above, FIG. 1 shows only one cylinder of multi-cylinder engine 10. Referring now to FIG. 2, a schematic diagram of a first example engine system 200 is shown, which may be included in the propulsion system of vehicle 5 of FIG. 1. For example, engine system 200 provides a first example engine configuration of engine 10 introduced in FIG. 1. As such, components previously introduced in FIG. 1 are represented with the same reference numbers and are not re-introduced. In the example shown in FIG. 2, engine 10 includes cylinders 13, 14, 15, and 18, arranged in an inline-4 configuration, although other configurations of engine 10 will be described with respect to FIGS. 3 and 4. The engine cylinders may be capped on the top by a cylinder head. With respect to FIG. 2, cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

Each of cylinders 13, 14, 15, and 18 includes at least one intake valve 4 and at least one exhaust valve 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems.

Each cylinder receives intake air (or a mixture of intake air and recirculated exhaust gas, as will be elaborated below) from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 and, where included, the port fuel injector 67, coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually optimized for each cylinder, as will be further described below with respect to FIG. 5.

Inside cylinders 14 and 15 are each coupled to one exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to a first exhaust manifold 81 via exhaust ports 86, and cylinders 13 and 18 channel exhaust gases to a second exhaust manifold 85 via exhaust ports 87. First exhaust manifold 81 and second exhaust manifold 85 do not directly communicate with one another (e.g., no passage directly couples the two exhaust manifolds to one another).

Engine system 200 further includes a turbocharger 164, including a turbine 165 and an intake compressor 162 coupled on a common shaft (not shown). In the example shown in FIG. 2, turbine 165 is a twin scroll (or dual volute) turbine. In such an example, a first, hotter scroll of the twin scroll turbine may be coupled to second exhaust manifold 85, and a second, cooler scroll of the twin scroll turbine may be coupled to first exhaust manifold 81 such that first exhaust manifold 81 and second exhaust manifold 85 remain separated up to the turbine wheel. For example, the two scrolls may each introduce gas around the entire perimeter of the wheel, but at different axial locations. Alternatively, the two scrolls may each introduce gas to the turbine over a portion of the perimeter, such as over approximately 180 degrees of the perimeter. In another example, engine 10 may include a monoscroll turbine. In some examples of the monoscroll turbine, first exhaust manifold 81 and second exhaust manifold 85 may combine prior to reaching the turbine wheel via a junction 202 as illustrated in FIG. 2. That is, the junction 202 connects the first exhaust manifold 81 and the second exhaust manifold 85 such that they converge. Thus, exhaust from the first exhaust manifold 81 and the second exhaust manifold 85 is mixed and directed downstream of junction 202 to turbine 165 via a singular passage 204. Via such configurations where the first exhaust manifold 81 and the second exhaust manifold 85 combine upstream of the turbine 165 as shown in FIG. 2, advantages as to reduced emissions may be achieved due to improved exhaust mixing. Temperature control advantages may further be achieved. Such conjoining of the first exhaust manifold 81 and the second exhaust manifold 85 upstream of the turbine 165 may be particularly advantageous to help consistent performance of the emission control device 70 when carrying out the varied fuel schedules of the stoichiometric, default split lambda, and rolling split lambda modes described in further detail herein. The twin scroll configuration may provide greater power to the turbine wheel compared with the monoscroll configuration by providing a minimum volume (e.g., exhaust gas from two cylinders and a smaller manifold volume) from a given combustion event. In contrast, the monoscroll configuration enables use of lower cost turbines that have higher temperature tolerances.

Rotation of turbine 165 drives rotation of compressor 162, disposed within intake passage 28. As such, the intake air becomes boosted (e.g., pressurized) at the compressor 162 and travels downstream to intake manifold 44. Exhaust gases exit turbine 165 into an exhaust passage 74. In some examples, a wastegate may be coupled across turbine 165 (not shown). Specifically, a wastegate valve may be included in a bypass coupled between an inlet of turbine 165 and exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

After exiting turbine 165, exhaust gases flow downstream in exhaust passage 74 to an emission control device 70. Emission control device 70 may include one or more emission control devices, such as one or more catalyst bricks and/or one or more particulate filters. For example, emission control device may 70 include a three-way catalyst configured to chemically reduce nitrogen oxides (NOx) and oxidize carbon monoxide (CO) and hydrocarbons (HC). In some examples, emission control device 70 may additionally or alternatively include a gasoline particulate filter (GPF). After passing through emission control device 70, exhaust gases may be directed out to a tailpipe. As an example, the three-way catalyst may be maximally effective at treating exhaust gas with a stoichiometric air-fuel ratio (AFR), as will be elaborated below.

Exhaust passage 74 further includes a plurality of exhaust sensors in electronic communication with controller 12, which is included in a control system 17. As shown in FIG. 2, exhaust passage 74 includes a first oxygen sensor 90 positioned upstream of emission control device 70. First oxygen sensor 90 may be configured to measure an oxygen content of exhaust gas entering emission control device 70. Exhaust passage 74 may include one or more additional oxygen sensors positioned along exhaust passage 74, such as a second oxygen sensor 91 positioned downstream of emission control device 70. As such, second oxygen sensor 91 may be configured to measure the oxygen content of the exhaust gas exiting emission control device 70. In one example, one or more of oxygen sensor 90 and oxygen sensor 91 may be universal exhaust gas oxygen (UEGO) sensors. Alternatively, a two-state exhaust gas oxygen sensor may be substituted for at least one of oxygen sensors 90 and 91. Exhaust passage 74 may include various other sensors, such as one or more temperature and/or pressure sensors. For example, as shown in FIG. 2, a sensor 96 is positioned within exhaust passage 74 upstream of emission control device 70. Sensor 96 may be a pressure and/or temperature sensor. As such, sensor 96 may be configured to measure the pressure and/or temperature of exhaust gas entering emission control device 70.

Second exhaust manifold 85 is directly coupled to an exhaust gas recirculation (EGR) passage 50 included in an EGR system 56. EGR passage 50 is coupled between second exhaust manifold 85 and intake passage 28, downstream of compressor 162. As such, exhaust gases are directed from second exhaust manifold 85 (and not first exhaust manifold 81) to air intake passage 28, downstream of compressor 162, via EGR passage 50, which provides high-pressure EGR. However, in other examples, EGR passage 50 may be coupled to intake passage 28 upstream of compressor 162.

As shown in FIG. 2, EGR passage 50 may include an EGR cooler 52 configured to cool exhaust gases flowing from second exhaust manifold 85 to intake passage 28 and may further include an EGR valve 54 disposed therein. Controller 12 is configured to actuate and adjust a position of EGR valve 54 in order to control a flow rate and/or amount of exhaust gases flowing through EGR passage 50. When EGR valve 54 is in a closed (e.g., fully closed) position, no exhaust gases may flow from second exhaust manifold 85 to intake passage 28. When EGR valve 54 is in an open position (e.g., from partially open to fully open), exhaust gases may flow from second exhaust manifold 85 to intake passage 28. Controller 12 may adjust the EGR valve 54 into a plurality of positions between fully open and fully closed. In other examples, controller 12 may only adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from second exhaust manifold 85. In some examples, EGR passage 50 may include additional sensors, such as temperature and/or humidity sensors, to determine a composition and/or quality of the exhaust gas being recirculated to intake passage 28 from second exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

Engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and EGR passage 50, as described above. Other sensors may include a throttle inlet temperature sensor for estimating a throttle air temperature (TCT) coupled upstream of throttle 62 in the intake passage. In at least one example, one of the sensors 16 may include one or more vibrational sensors. Such one or more vibrational sensors may be positioned throughout engine 10 in order to detect driveline NVH. Further, it should be noted that engine 10 may include all or only a portion of the sensors shown in FIG. 2. As another example, actuators 83 may include fuel injectors 66, port fuel injectors 67, throttle 62, CRV 42, EGR valve 54, and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 5.

The configuration of engine system 200 may enable engine performance enhancement while reducing vehicle emissions. In particular, by including separate exhaust manifolds that do not directly communicate and that receive exhaust gases from different cylinders, the gases received by first exhaust manifold 81 may have a different AFR than the gases received by second exhaust manifold 85. Herein, the AFR will be discussed as a relative AFR, defined as a ratio of an actual AFR of a given mixture to stoichiometry and represented by lambda ($\lambda$). A lambda value of 1 occurs during stoichiometric operation (e.g., at stoichiometry), wherein the air-fuel mixture produces a complete combustion reaction. A rich feed ($\lambda<1$) results from air-fuel mixtures with more fuel relative to stoichiometry. For example, when a cylinder is enriched, more fuel is supplied to the cylinder via fuel injector 66 and/or port fuel injector 67 than for producing a complete combustion reaction with an amount of air in the cylinder, resulting in excess, unreacted fuel. In contrast, a lean feed ($\lambda>1$) results from air-fuel mixtures with less fuel relative to stoichiometry. For example, when a cylinder is enleaned, less fuel is delivered to the cylinder via fuel injector 66 and/or port fuel injector 67 than for producing a complete combustion reaction with the amount of air in the cylinder, resulting in excess, unreacted air. During nominal engine operation, the AFR may fluctuate about stoichiometry, such as by $\lambda$ generally remaining within 2% of stoichiometry. For example, the engine may transition from rich to lean and from lean to rich between injection cycles, resulting in an "average" operation at stoichiometry.

Further, during some engine operating conditions, the AFR may be deviated from stoichiometry. As one example, global enrichment (in which each cylinder is operated with a rich AFR) is a conventional performance enhancement strategy to increase engine power. Generally, higher cylinder air charges result in more engine torque and thus more engine power, with the cylinder fueling correspondingly increased based on the higher air charge to maintain the enrichment. In particular, the additional, unreacted fuel cools engine system components, including the downstream turbine 165 and emission control device 70, enabling more air flow for increased power while reducing heat-related degradation to the downstream components (versus operating at stoichiometry with the higher cylinder air charge). However, as mentioned above, emission control device 70 is most effective at stoichiometry, and thus, the above described global enrichment strategy results in increased vehicle emissions, particularly increased CO and HC emissions.

Therefore, according to the present disclosure, such as when high engine torque (or high engine power) is demanded, a first set of cylinders may be operated at a first, rich AFR, and a second, remaining set of the engine cylinders may be operated at a second, lean AFR. Such operation will be referred to herein as "split lambda" operation (or operation in a split lambda mode). It is noted that both the default split lambda mode and the rolling split lambda mode described herein are examples of split lambda operation. In particular, the inside cylinders may be operated at the lean AFR, resulting cylinders 14 and 15 feeding lean exhaust gas to first exhaust manifold 81, and the outside cylinders may be operated at the rich AFR, resulting in cylinders 13 and 18 feeding rich exhaust gas to second exhaust manifold 85. The lean exhaust gas in first exhaust manifold 81 may be isolated from the rich exhaust gas in second exhaust manifold 85 prior to mixing at and downstream of turbine 165. Further, a degree of enleanment of the second set of cylinders may selected based on a degree of enrichment of the first set of cylinders so that the exhaust gas from the first set of cylinders may mix with the exhaust gas from the second set of cylinders to form a stoichiometric mixture, even while none of the cylinders are operated at stoichiometry. Further still, the degree of enrichment of the first set of cylinders (and the degree of enleanment of the second set of cylinders) is greater than the typical fluctuation about stoichiometry performed during nominal engine operation. As an example, the first set of cylinders may be operated at a rich AFR having a lambda value in a range from 0.95-0.8 (e.g., 5-20% rich).

By maintaining engine 10 at overall (e.g., global) stoichiometry, even while operating in the split lambda operating mode, tailpipe emissions may be reduced. For example, operating in the split lambda mode may result in a substantial reduction in CO emissions compared to conventional enriched engine operation (e.g., a 90% reduction) while providing increased engine cooling and increased engine power, similar to the conventional enriched engine operation. As an example, controller 12 may transition engine 10 to and from the split lambda operating mode responsive to an increased engine demand, as will be further described with respect to FIG. 5.

Further, because EGR passage 50 is coupled to second exhaust manifold 85, which receives the enriched exhaust gas from outside cylinders 13 and 18 in during the split lambda operation, the exhaust gas recirculated to intake passage 28 (and supplied to every cylinder of engine 10) may be enriched. The enriched EGR contains relatively high concentrations (or amounts) of CO and hydrogen gas compared with lean EGR and stoichiometric EGR. CO and hydrogen gas have high effective octane numbers, offsetting the knock limit of each cylinder and creating an opportunity for additional spark advance to both the enriched and enleaned cylinders. The spark advance provides additional temperature relief to turbine 165 and emission control device 70, enabling even more air flow (and thus engine power) than when engine 10 is operated without enriched EGR. Thus, the cooled, enriched EGR may provide additional knock and efficiency benefits to engine 10. Further still, even prior to operating in the split lambda mode and enriching the EGR, providing EGR at high engine loads may provide engine cooling, enabling engine air flow to be increased relative to when no EGR is provided.

Figure 3:
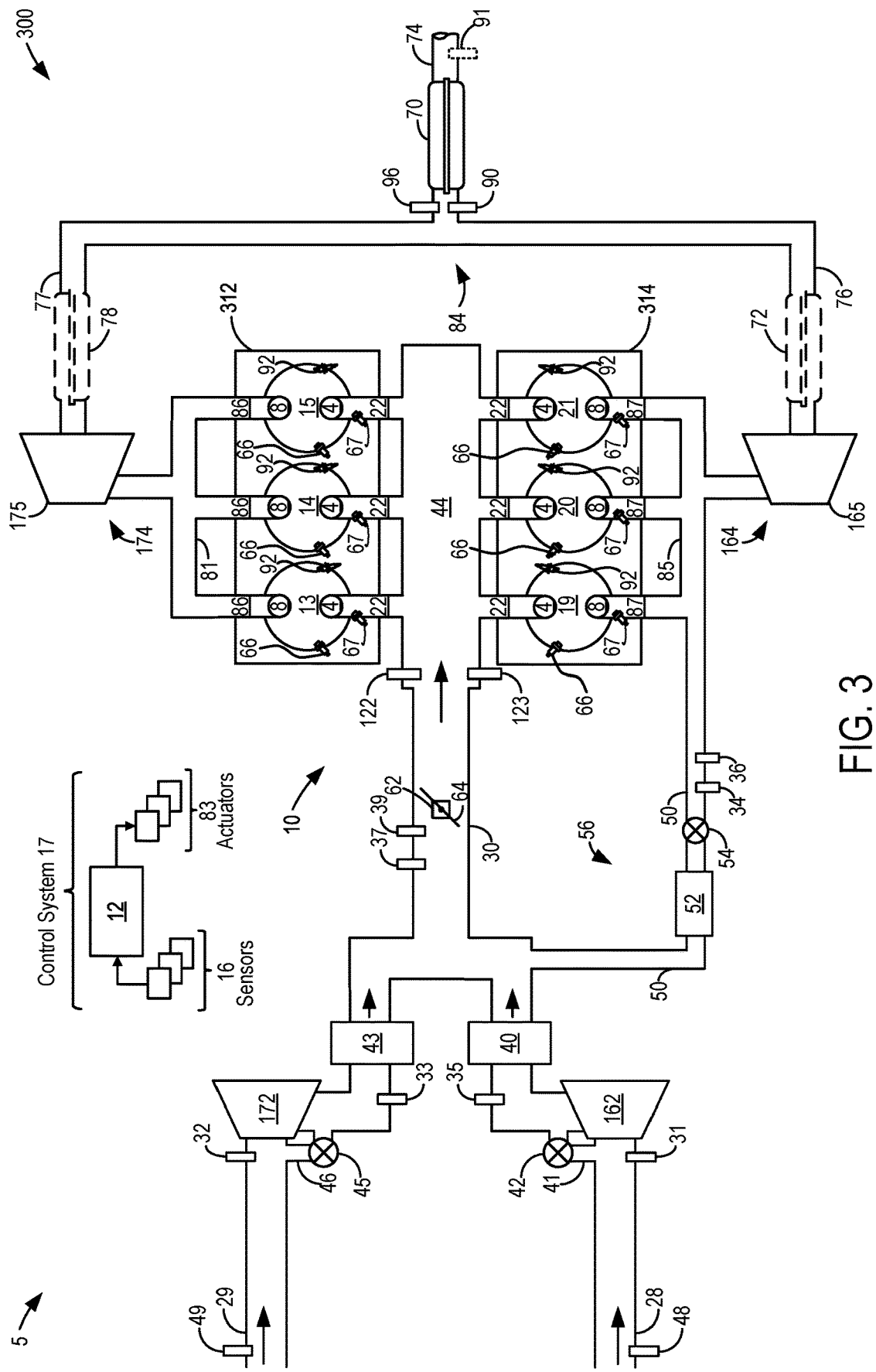
FIG. 3 shows a schematic depiction of a second example of an engine system.

Other engine system configurations may also enable operation in the split lambda mode with enriched EGR for increased engine power and reduced emissions. Next, FIG. 3 shows a second example configuration of engine 10. Specifically, FIG. 3 shows an example engine system 300 with engine 10 including cylinders 13, 14, 15, 19, 20, and 21 in a V-6 configuration. However, other numbers of engine cylinders are also possible, such as a V-8 configuration. Except for the differences described below, engine system 300 may be substantially identical to engine system 200 of FIG. 2. As such, components previously introduced in FIGS. 1 and 2 are represented with the same reference numbers and are not re-introduced.

In the example of engine system 300, engine 10 includes two engine banks, first engine bank 312 and second engine bank 314. Specifically, first engine bank 312 includes cylinders 13, 14, and 15, each coupled to intake manifold 44 via intake ports 22, and second engine bank 314 includes cylinders 19, 20, and 21, each coupled to intake manifold 44 via intake ports 22. Each of cylinders 13, 14, and 15 of first engine bank 312 exhausts combustion gases to first exhaust manifold 81 via exhaust ports 86. From first exhaust manifold 81, the gases may be directed to a turbine 175 of a turbocharger 174. In contrast, each of cylinders 19, 20, and 21 of second engine bank 314 exhausts combustion gases to second exhaust manifold 85, which is separate from exhaust manifold 85, via exhaust ports 87. For example, no passages directly couple first exhaust manifold 81 and second exhaust manifold 85. From second exhaust manifold 85, the gases may be directed to turbine 165 of turbocharger 164, which is different than turbocharger 174. For example, turbine 175 is positioned in a first exhaust passage 77 and receives exhaust gases exclusively from first exhaust manifold 81 for driving a compressor 172 positioned in an intake passage 29. Turbine 165 is positioned in a second exhaust passage 76 and receives exhaust gases exclusively from exhaust manifold 85 for driving compressor 162 positioned in intake passage 28. For example, as shown, compressor 172 may be coupled in parallel with compressor 162.

Thus, in the example configuration of engine system 300, exhaust system 84 includes two separate exhaust manifolds, first exhaust manifold 81 and second exhaust manifold 85, each coupled to engine cylinders of a single engine bank. Further, exhaust system 84 includes two turbochargers, turbocharger 164 and turbocharger 174, each having a turbine positioned to receive exhaust gas from only one of the two exhaust manifolds.

First exhaust passage 77 and second exhaust passage 76 merge and are coupled to exhaust passage 74 downstream of turbines 175 and 165, respectively. Exhaust passage 74 serves as a common exhaust passage. In some examples, one or both of exhaust passages 77 and 76 may include a close-coupled catalyst downstream of the corresponding turbine and upstream of exhaust passage 74. In the example shown in FIG. 3, a first close-coupled catalyst 78 is optionally positioned in first exhaust passage 77 downstream of turbine 175 and upstream of where first exhaust passage 77 couples with common exhaust passage 74, and a second close-coupled catalyst 72 is optionally positioned in second exhaust passage 76 downstream of turbine 165 and upstream of where second exhaust passage 76 couples with common exhaust passage 74. In contrast, emission control device 70 is positioned in common exhaust passage 74. Thus, while first close-coupled catalyst 78 receives exhaust gas exclusively from first engine bank 312 (e.g., via first exhaust manifold 81 and turbine 175) and second close-coupled catalyst 72 receives exhaust gas exclusively from second engine bank 314 (e.g., via second exhaust manifold 85 and turbine 165), emission control device 70 receives exhaust gas from both first engine bank 312 and second engine bank 314, and all of the exhaust gas directed out the tailpipe passes through exhaust passage 74 and emission control device 70. However, in other examples, first close-coupled catalyst 78 and/or second close-coupled catalyst 72 may be omitted.

When first close-coupled catalyst 78 and second close-coupled catalyst 72 are included, they may reduce vehicle emissions prior to operating in the split lambda mode (e.g., during an engine cold start). For example, due to being positioned closer to engine 10, first close-coupled catalyst 78 and second close-coupled catalyst 72 may receive more heat from the engine than emission control device 70 and may therefore achieve light-off faster. However, first close-coupled catalyst 78 and second close-coupled catalyst 72 may be less efficient while operating in the split lambda mode due to receiving only rich or lean exhaust gas. In such examples, emission control device 70 may effectively treat exhaust gas components not treated by first close-coupled catalyst 78 and second close-coupled catalyst 72.

As shown in FIG. 3, exhaust passage 74 includes first oxygen sensor 90 and sensor 96, each positioned upstream of emission control device 70, and the optional second oxygen sensor 91, positioned downstream of emission control device 70, as in engine system 200 described above with respect to FIG. 2. In other examples, additionally or alternatively, exhaust gas sensors, such as oxygen, temperature and/or pressure sensors, may be coupled to first exhaust passage 77 and/or second exhaust passage 76. For example, an oxygen sensor may be coupled to first exhaust passage 77 upstream of first close-coupled catalyst 78 and/or coupled to second exhaust passage 76 upstream of second close-coupled catalyst 72.

Intake passages 28 and 29 may be configured as two parallel intake passages that merge and couple to a common intake passage 30 upstream of throttle 62. As shown in FIG. 3, intake passage 28 includes CAC 40, as introduced in FIG. 2, and intake passage 29 includes a second CAC 43. However, in other examples, a single charge air cooler may be included, such as positioned in common intake passage 30 upstream of throttle 62. Intake passage 29 may include a second set of some or all of the various sensors positioned in intake passage 28 and described above with respect to FIG. 2 for determining various qualities of the intake air being provided to engine 10. For example, intake passage 29 is shown including a MAF sensor 49, a temperature sensor 32, and an intake oxygen sensor 33. Alternatively, only one of intake passages 28 and 29 may include each sensor. For example, intake passage 28 may include MAF sensor 48 and temperature sensor 31 (and not intake oxygen sensor 35), and intake passage 29 may include intake oxygen sensor 33 (and not MAF sensor 49 and temperature sensor 32). As another example, intake passage 29 may include MAF sensor 49 (and not temperature sensor 32 and intake oxygen sensor 33), and intake passage 28 may include temperature sensor 31 and intake oxygen sensor 35 (and not MAF sensor 48).

Further, intake passage 29 may include a compressor recirculation passage 46 for recirculating compressed air from an outlet of compressor 172, upstream of CAC 43, to an inlet of compressor 172. A CRV 45 may be provided for adjusting an amount of flow recirculated to the inlet of compressor 172. Thus, compressor recirculation passage 46 and CRV 45 may function similarly to compressor recirculation passage 41 and CRV 42, respectively, as described above with respect to FIG. 2.

In the example of engine system 300, EGR passage 50 is directly coupled to second exhaust manifold 85 and is not coupled to first exhaust manifold 81. Thus, EGR system 56 recirculates exhaust gases produced by combustion in second engine bank 314 and not first engine bank 312 when EGR valve 54 is at least partially open. Further EGR passage 50 is shown coupled to intake passage 28 downstream of CAC 40 and upstream of where intake passage 28 couples to common intake passage 30. However, in other examples, EGR passage 50 may be coupled to common intake passage 30, such as upstream of throttle 62. Because intake passage 28 flows intake air to common intake passage 30, which provides intake air to every cylinder of engine 10 via intake manifold 44, when EGR is requested, the recirculated exhaust gas may be provided to each cylinder of engine 10.

Due to the configuration of EGR system 56, the cylinders of second engine bank 314 may be operated at the first, rich AFR, and the cylinders of first engine bank 312 may be operated at the second, lean AFR. In particular, cylinders 19, 20, and 21 may be operated at the rich AFR, resulting in rich exhaust gas flowing to second exhaust manifold 85, a portion of which may be recirculated to intake passage 28 via EGR passage 50. Cylinders 13, 14, and 15 may be operated at the lean AFR, resulting in lean exhaust gas flowing to first exhaust manifold 81. The lean exhaust gas in first exhaust manifold 81 is isolated from the rich exhaust gas in second exhaust manifold 85 prior to mixing at exhaust passage 74. Thus, while rich exhaust gas may flow through second close-coupled catalyst 72 and lean exhaust gas may flow through first close-coupled catalyst 78 during the split lambda operation, the exhaust gas flowing through emission control device 70 may be maintained stoichiometry, on average, to decrease emissions.

Figure 4:
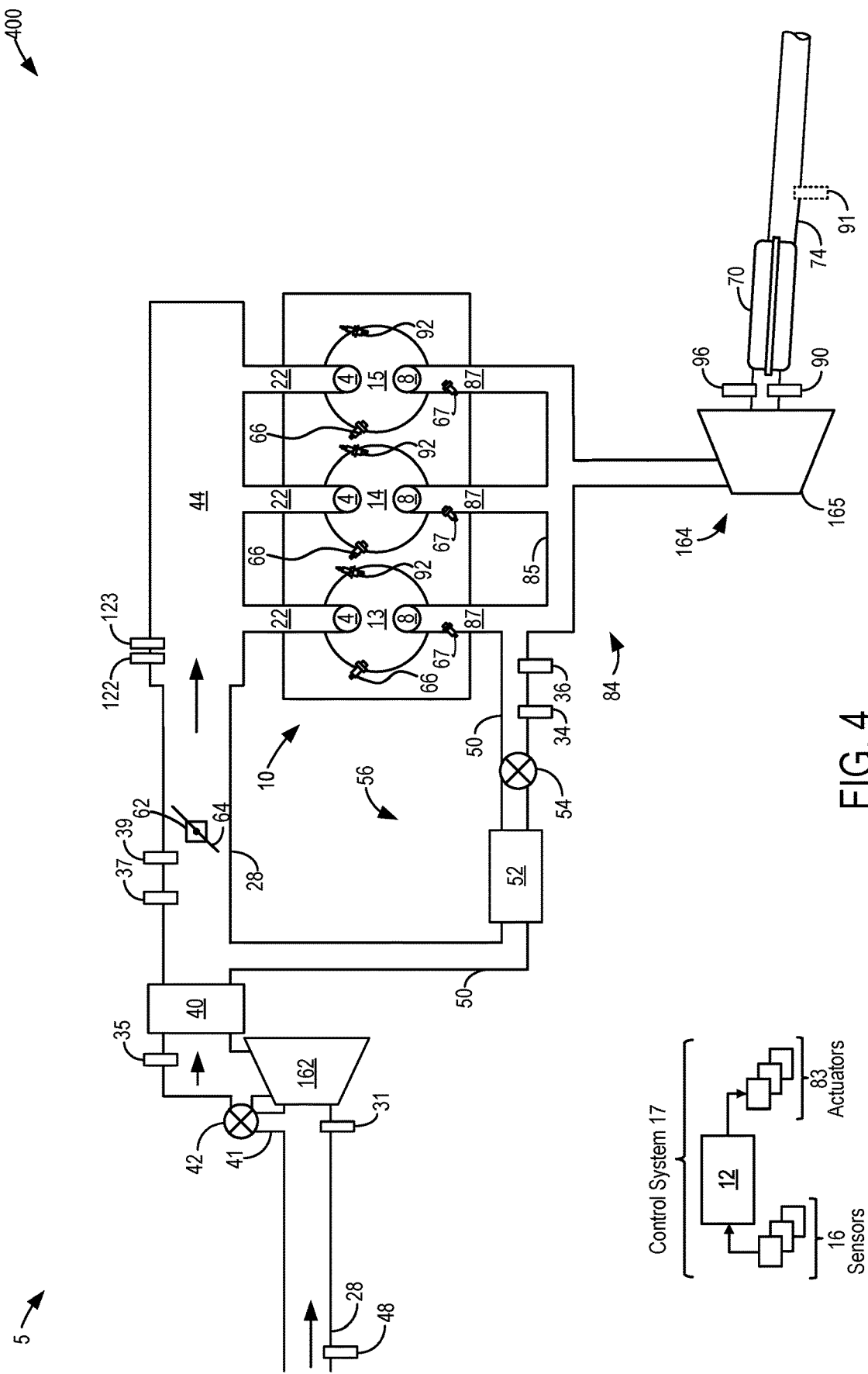
FIG. 4 shows a schematic depiction of a third example of an engine system.

Still other engine systems may be operated in the split lambda mode. Turning to FIG. 4, a third example configuration of engine 10 is shown. Specifically, FIG. 4 shows an example engine system 400, with engine 10 having an inline-3 configuration instead of the inline-4 configuration of engine system 200 of FIG. 2. Except for the differences described below, engine system 400 may be substantially identical to engine system 200 of FIG. 2. As such, components previously introduced in FIGS. 1-3 are represented with the same reference numbers and are not re-introduced.

As mentioned above, in the example of engine system 400, engine 10 includes cylinders 13, 14, and 15, arranged in an inline-3 configuration. Further, exhaust system 84 of engine system 300 includes only exhaust manifold 85. As such, exhaust manifold 85 is coupled to each of cylinders 13, 14, and 15 (e.g., every cylinder of engine 10) via exhaust ports 87, and exhaust manifold 85 receives exhaust gases expelled from all of the cylinders of engine 10. The exhaust gases received by exhaust manifold 85 may be channeled to turbine 165, as described above.

When EGR is provided via EGR system 56, such as when EGR valve 54 is at least partially open, a portion of the exhaust gas may flow through EGR passage 50. In the example of engine system 300, EGR passage 50 may receive exhaust gas originating from each of cylinders 13, 14, and 15. However, EGR passage 50 is coupled to exhaust port 87 of cylinder 13, upstream of where exhaust port 87 of cylinder 13 joins exhaust manifold 85. Due to the position of EGR passage 50 of exhaust port 87 and fluid dynamics within exhaust manifold 85, a much higher proportion of the exhaust gas recirculated through EGR passage 50 may originate from combustion within cylinder 13 compared with cylinders 14 and 15. For example, at least 80% of the exhaust gas flowing through EGR passage 50 may originate from combustion within cylinder 13. However, in other examples the EGR passage 50 may simply be coupled to exhaust manifold 85.

Due to the odd number of cylinders in engine 10 in engine system 400, operation in the split lambda mode may be different than when the engine has an even number of cylinders (such as in engine system 200 of FIG. 2 and engine system 300 of FIG. 3). For example, cylinders 13, 14, and 15 each may be operated with a different AFR while the exhaust gas that flows from exhaust manifold 85 to emission control device 70 maintains global stoichiometry. That is, a first cylinder may be operated at a first, rich AFR, a second cylinder may be operated at a second, stoichiometric AFR, and a third, remaining cylinder may be operated at a third, lean AFR, resulting in a stoichiometric mixture upstream of emission control device 70.

Thus, the systems of FIGS. 2-4 provide three example engine configurations (e.g., an inline configuration having an even number of cylinders, a V-configuration, and an inline configuration having an odd number of cylinders) and descriptions of how each of the three engine configurations enables operation in the split lambda mode with enriched EGR, thereby increasing engine power while decreasing fuel usage and reducing vehicle emissions. Note that the number of cylinders in each configuration may be changed without parting from the scope of this disclosure.

Turning to FIG. 5, FIG. 5 provides an example engine operation method 500, including operation in a default split lambda mode and a rolling split lambda mode. For example, the default split lambda combustion strategy inherently causes an imbalance between rich and lean cylinders due to different burn rates, which may result in engine vibrations. Therefore, method 500 provides a control strategy for mitigating this imbalance in order to reduce the engine vibrations, including a torque calculation approach. Moreover, during conditions in which the engine is operating in a region where a default split lambda fueling schedule excites the engine resonant frequency, method 500 includes a control strategy for transitioning into a rolling split lambda mode, during which a fueling schedule is altered to prevent issues of NVH. Instructions for carrying out method 500 and the rest of the methods included herein may be executed by a controller (e.g., controller 12 of FIGS. 1-4) based on instructions stored on a memory of the controller and in conjunction with signals received from sensors of the engine system, such as the sensors described above with reference to FIGS. 1-4. The controller may employ engine actuators of the engine system (e.g., fuel injectors 66, 67 of FIGS. 1-4, spark plug 92 of FIGS. 1-4, and throttle valve 62 of FIGS. 1-4) to adjust engine operation according to the methods described below. Moreover, it is noted that reference to an emission control device at FIGS. 5-10 may refer to an emission control device such as emission control device 70 shown in FIGS. 1-4.

At 502, method 500 includes estimating and/or measuring engine operating conditions. The operating conditions may include, for example, a throttle position, brake pedal position, an accelerator pedal position, ambient temperature and humidity, barometric pressure, engine speed, engine load, engine torque, engine temperature, mass air flow (MAF), intake manifold pressure (MAP), a commanded AFR, an actual AFR of exhaust gas entering an emission control device (e.g., emission control device 70 of FIGS. 2-4), an exhaust temperature, etc.

As an example, the controller may use the accelerator pedal position to determine the engine torque demanded by a vehicle operator. For example, the controller may input the accelerator pedal position and the engine speed into an engine map to determine the engine torque demand. Further, the controller may determine engine power produced based on the engine torque and the engine speed, such as by multiplying the engine torque by the engine speed. As another example, the controller may determine a boost pressure provided by a turbocharger (e.g., turbocharger 164 of FIGS. 2-4) based on (e.g., as a function of) MAP and the barometric pressure. Furthermore, as discussed later herein, the controller may input the engine speed and the engine load into an engine map to determine whether the engine is operating in a default split lambda mode or a rolling split lambda mode is optimal for reducing NVH and exhaust temperature.

As part of estimating and measuring engine operating conditions at step 502, the controller may estimate a torque output of the cylinders, taking into account torque modifiers. These torque modifiers may include one or more of an AFR, spark timing as a distance from maximum brake torque (MBT) timing, and EGR. For example, the controller may refer to one or more look-up tables which include information as to the AFR and spark timing effects on torque output. These look-up tables may include information such as provided in FIG. 6 and FIG. 7, in at least one example. In at least one example, such look-up tables may be stored on board in memory of the controller. Additionally or alternatively, these look-up tables may be stored remotely as part of a cloud storage system, and these look-up tables may be accessed by the controller by way of a wireless connection. In one or more examples, it is noted that FIGS. 6 and 7 may be integrated into the torque modifiers to include in either real-time or predictive torque output calculations. Discussion as to approaches for performing torque output calculations, including the determination of torque output modifiers, is included in further detail below.

Figure 6:
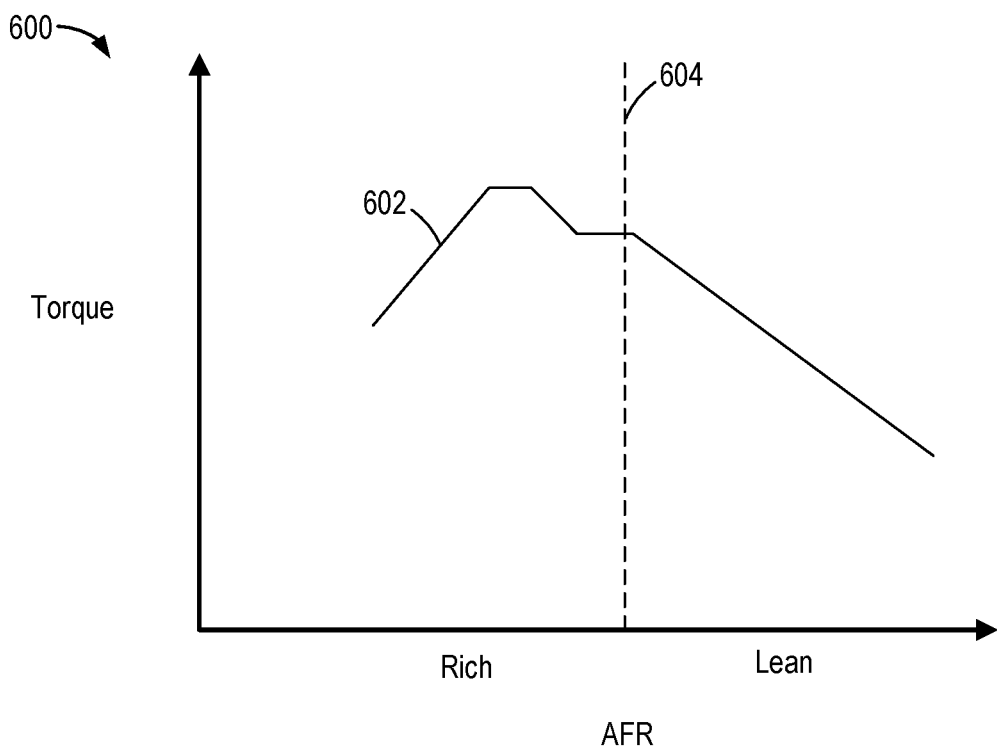
FIG. 6 shows a schematic depiction illustrating an example air fuel ratio (AFR) effect on torque generation.
Figure 7:
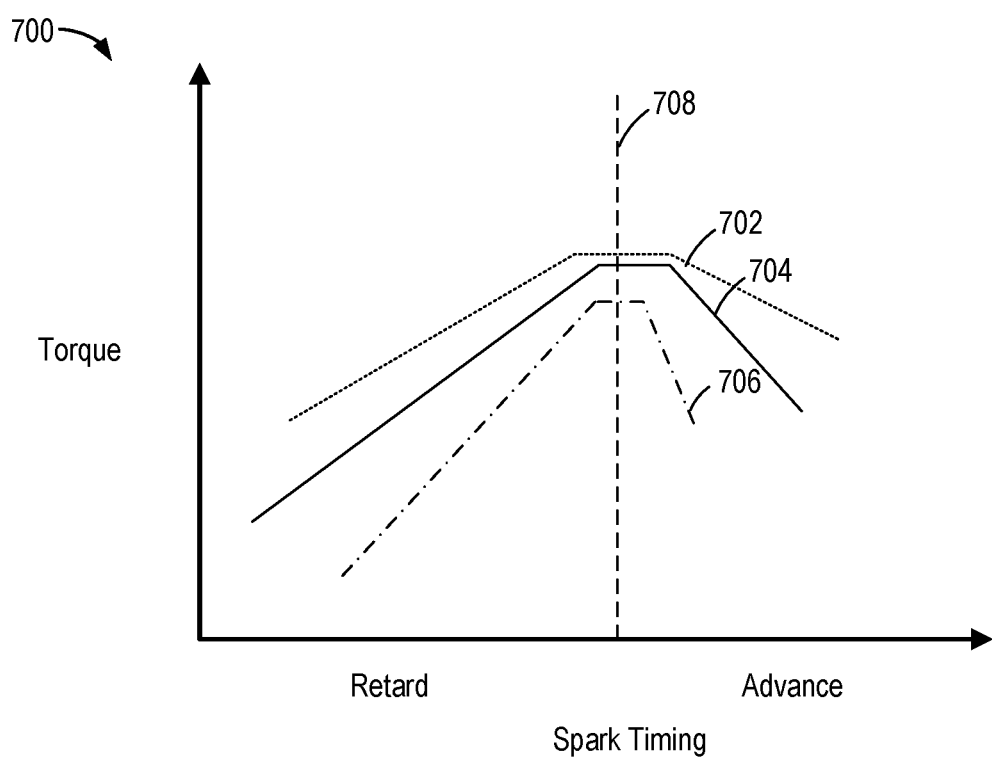
FIG. 7 shows a schematic depiction of example spark timing and torque output at various air-fuel ratios.

Turning briefly to FIG. 6 and FIG. 7, FIG. 6 and FIG. 7 illustrate some of the effects of such torque modifiers. In particular, FIG. 6 shows a schematic depiction 600 illustrating an example AFR effect on torque generation 602, where spark timing is kept constant. As shown in FIG. 6, 602 shows the torque at the y-axis is plotted as a function of AFR at the x-axis. The torque at the y-axis increases with a direction of the y-axis arrow, and the AFR at the x-axis increases with a direction of the x-axis arrow from a rich AFR to a lean AFR.

As may be seen in FIG. 6, torque generation 602 generally increases from a lean AFR to a stoichiometric AFR 604, with the torque generation 602 being approximately the same at the stoichiometric AFR 604 as when the AFR is only slightly lean. When operating only slightly rich of the stoichiometric AFR 604, torque generation 602 is approximately the same as at the stoichiometric AFR 604. As the AFR becomes increasingly rich, however, the torque generation 602 increases, then plateaus, and then eventually decreases.

Turning to FIG. 7, FIG. 7 shows a schematic depiction 700 illustrating example spark timing and torque output at various air-fuel ratios (AFRs), including a rich AFR 702, stoichiometric AFR 704, and a lean AFR 706. As illustrated at FIG. 7, torque generation is plotted as a function of spark timing. The torque generation is represented by the y-axis and increases in a direction of the y-axis arrow. The spark timing is represented by the x-axis, with a degree of advancement increasing in a direction of the x-axis arrow. Further, MBT spark timing is shown at 708. As may be seen in FIG. 7, moving from retarded spark timing to MBT 708, torque generation increases for each of the rich AFR 702, stoichiometric AFR 704, and lean AFR 706. However, a rate of increase in torque generation when adjusting the spark timing from retarded spark timing to MBT 708 differs for each of the rich AFR 702, stoichiometric AFR 704, and lean AFR 706. In particular, adjusting the spark timing from retarded spark timing to MBT 708 increases torque generation of the lean AFR 706 at a higher rate than both the rich AFR 702 and the stoichiometric AFR 704. Further, adjusting the spark timing from retarded spark timing to MBT 708 increases torque generation of the rich AFR 702 at a lower rate than both the lean AFR 706 and the stoichiometric AFR 704. When the spark timing is at approximately MBT 708, the torque generation for each of the rich AFR 702, stoichiometric AFR 704, and lean AFR 706 peaks and plateaus.

Thus, only slightly retarding or slightly advancing the spark timing relative to MBT 708 does not significantly impact an amount of torque generation for any of the AFRs. The range of spark timing where torque generation peaks occurs is different for each of the rich AFR 702, stoichiometric AFR 704, and lean AFR 706. The rich AFR 702 has the largest spark timing range for torque generation peak, followed by the stoichiometric AFR 704, and the lean AFR 706 has the smallest torque generation plateau.

Looking now to advancing the spark timing relative to MBT 708, torque generation for each of the rich AFR 702, stoichiometric AFR 704, and lean AFR 706 plateaus and then decreases when advancing the spark timing relative to MBT 708. Moreover, similar to adjusting spark timing from retarded to MBT 708, adjusting spark timing from MBT 708 to advanced impacts torque generation of the various AFRs at different rates.

In particular, adjusting the spark timing from MBT 708 to advanced spark timing decreases torque generation of the lean AFR 706 at a higher rate than both the rich AFR 702 and the stoichiometric AFR 704. Further, adjusting the spark timing from MBT 708 to advanced spark timing decreases torque generation of the rich AFR 702 at a lower rate than both the lean AFR 706 and the stoichiometric AFR 704.

Turning back to step 502 of FIG. 5, as a part of the estimating and/or measuring the engine operating conditions, method 500 may include carrying out torque output calculations at step 503. The torque calculations at step 503 may be used to estimate engine torque, compare the engine torque to a driver demand, determine whether the estimated engine torque matches the driver demand, and adjust corresponding actuators accordingly (e.g., throttle, wastegate, cams, fueling, etc.), in at least one example. Additionally or alternatively, the torque calculations at step 503 may be used in a predictive manner as described later under scenario analysis.

It is noted that cylinders using PFI as compared to DI fueling may have different trapped masses, which affects the cylinder torque. As such, PFI as compared to DI fueling may impact knock and therefore spark, which is accounted for in the spark modifier discussed below.

In a first approach, the torque output calculations at step 503 may include calculating the torque output for each cylinder separately and then summing the torque outputs together as follows:

$$Tq_{cyl,0} = TqMod_{cyl}(\text{engspeed, load, VCT}) \times Tq_{engine}(\text{engspeed, load, VCT})/N_{cyl}$$

$$Tq_{cyl} = Tq_{cyl,0} \times TqMod_{AFR}(\lambda_{cyl}) \times TqMod_{spk}(\text{SpkRetMBT}_{cyl}) \times TqMod_{DI}(\text{fDI}_{cyl}) \times TqMod_{EGR}$$

$$Tq_{total} = \Sigma_{all\ cylinders} Tq_{cyl}$$

For reference, $Tq_{cyl,0}$ is a cylinder torque for stoichiometric, with MBT, and no EGR operation. $Tq_{cyl}$ is the torque output of an individual cylinder, which may be either a lean cylinder or a rich cylinder. $TqMod_{cyl}$ is a modifier to account for variation in cylinder breathing (that is, cylinder intake and exhaust). Such variation may be based on one or more of a VCT of the particular cylinder and a position of the cylinder in the cylinder arrangement. $TqMod_{spk}$ may be a torque modifier based on spark using a function or a look-up table (such as a 1-D table). The $TqMod_{spk}$ looked up in such a table may either be a $TqMod_{spk}$ (SpkRetMBT$_{cyl}$) if the spark timing is retarded from MBT or a $TqMod_{spk}$ (SpkAdvMBT$_{cyl}$) if the spark timing is advanced from MBT for a particular cylinder. The look-up table for an advanced or retarded $TqMod_{spk}$ may include information, such as shown at FIG. 7. Moreover, the $TqMod_{spk}$ may take into account the knock limits of an individual cylinder and thus vary from cylinder to cylinder to avoid such knock limits. Such knock limits of an individual cylinder may be based on one or more of the breathing characteristics and the amount of rich or lean bias of the cylinder, in one or more examples.

It is noted that while the above equation reflects SpkRetMBT$_{cyl}$ for spark retard from MBT that the equation above may instead reflect SpkAdvMBT$_{cyl}$ in a case where the spark timing of the individual cylinder being evaluated is advanced of MBT. In at least one example, a different value may be assigned to the lean cylinders compared to the rich cylinders for $TqMod_{spk}$, at least in part on an amount of rich or lean bias taking into account a function or look-up table such as the one shown at FIG. 6. Additionally, the SpkRetMBT$_{cyl}$ or SpkAdvMBT$_{cyl}$ spark timing may vary among each group due to individual cylinder knock control. $TqMod_{AFR}$ may be a function or a look-up table (such as a 1-D table). For example, the $TqMod_{AFR}$ may be based on a function or look-up table such as shown at FIG. 6. $\lambda_{cyl}$ represents a rich λ value for rich cylinders and a lean λ value for lean cylinders. $TqMod_{DI}$ is a modifier for DI fraction. For example, 0 or 0.1 $TqMod_{DI}$ may be assigned to rich cylinders, and 1 or 0.9 $TqMod_{DI}$ may be assigned to the lean cylinders. $TqMod_{EGR}$ is a value which may take into account the impact of additional fuel from EGR. The $TqMod_{EGR}$ may be based on a function or a look-up table, in at least one example.

It is noted that the torque modifiers may include AFR, spark timing as a distance from MBT (SpkRetMBT), DI fraction (fDI), and EGR. In this first approach, feed forward spark is calculated as a function of engine speed and load. Additionally, the torque modifiers (rich or lean) are applied for AFR, spark timing, and EGR, and these modifiers are applied to individual cylinders depending on if that cylinder is a rich cylinder or lean cylinder. This first approach for performing torque calculations is particularly advantageous for obtaining accurate torque estimates when operating the engine in the rolling split lambda mode. This is at least due in part to cylinder-to-cylinder variations in the AFR and the spark timing which occur in the split lambda mode. Further, as the cylinders may be varied in torque output from cylinder to cylinder in the rolling split lambda mode, performing torque output calculations for each cylinder separately may be advantageous to monitor engine balancing.

By computing individual cylinder torques, cylinder-to-cylinder variation in breathing (air intake and exhaust) can advantageously be accounted for. For example, these variations in cylinder breathing can be more pronounced on some engine configurations like a V8 with cross-plane crankshaft, where a positioning of the cylinder may vary the breathing characteristics of the cylinders.

Changing which set of cylinders is lean and which set is rich, even if the total number of rich and lean cylinders remained the same can result in a different engine torque due to cylinder-to-cylinder variation in breathing, in at least one example. Such variation may further be due to fuel puddling in at least one example. That is, in cases of PFI, fuel puddling from the PFI may contribute to a cylinder-to-cylinder variance in torque output.

In the case of carrying out a rolling split lambda mode, these sets of lean cylinders and rich cylinders will be changing from cycle to cycle. Thus, it may be particularly advantageous to follow the first approach for calculating a total torque output of the engine ($Tq_{total}$) as described above, where the torque output of the cylinders is individually calculated and then summed ($\Sigma_{all\ cylinders} Tq_{cyl}$) while carrying out the rolling split lambda mode.

Further, some cylinders may be more prone to knock than others, and thus individual knock control will adjust the spark accordingly. Computing individual cylinder torques and then summing the individual cylinder torques advantageously allows to account for the impact of individual cylinder spark retard.

In at least one example, it is noted that the torque output of the engine may be based on current engine operating conditions using outputs of one or more sensors of the engine for the calculations described above in the first approach. In other examples, however, a predictive torque output of the engine may instead be predictive values generated by a controller of the engine and used as part of a scenario analysis in the first approach.

In addition to the above first approach for performing toque output calculations, the torque output calculations that account for torque modifiers may further be carried out via a second approach where lean and rich cylinders are grouped together as a virtual bank of cylinders for calculation purposes. Via the second approach, feed forward spark is calculated as a function of engine speed and load. Additionally, modifiers (rich or lean) are applied for AFR and EGR, and applied to the rich and lean banks of cylinders depending on if the cylinders in the bank are rich or lean cylinders. It is noted that the banks of cylinders may also be referred to as groups of cylinders herein. Via the second approach, the torque may be calculated as follows:

$$Tq_{cylinder,average} = Tq_{engine}(engspeed, load, VCT) / N_{cylinders}$$

$$Tq_{lean\ group} = Tq_{cylinder,average} \times N_{lean\ cylinders} \times TqMod_{lean}$$

$$Tq_{rich\ group} = Tq_{cylinder,average} \times N_{rich\ cylinders} \times TqMod_{rich}$$

$$Tq_{total} = Tq_{lean\ group} + Tq_{rich\ group}$$

Grouping the cylinders for performing torque estimations may achieve the technical effect of calculation efficiency and a reduced computing load on the controller compared to other approaches which do not carry out such grouping.

In the example second approach shown above, an average cylinder torque output ($Tq_{cylinder,average}$) for all of the plurality of cylinders of the engine is calculated based on a torque output of the engine ($Tq_{engine}$) divided by a total number of the plurality of cylinders of the engine ($N_{cylinders}$). The average cylinder torque output ($Tq_{cylinder,average}$) is based on stoichiometric operating conditions, in at least one example. The torque output of the engine takes into account an engine speed (engspeed), engine load (load), and variable cam timing (VCT) of the engine. In at least one example, it is noted that the torque output of the engine may be based on current engine operating conditions using outputs of one or more sensors of the engine. In other examples, however, a predictive torque output of the engine may instead be predictive values generated by a controller of the engine and used as part of a scenario analysis.

Continuing with the second approach, a torque output of a lean group of cylinders ($Tq_{lean\ group}$) of the engine is calculated, and a torque output of the rich group of cylinders ($Tq_{rich\ group}$) is calculated. The lean group of cylinders comprises all enleaned cylinders of the plurality of cylinders. The rich group of cylinders comprises all enriched cylinders of the plurality of cylinders. It is noted that an amount of rich bias for each of the enriched cylinders may be same in the second approach. Further, the amount of lean bias for each of the enleaned cylinders may be the same in the second approach.

To calculate the torque output of the lean group of cylinders, the total number of lean cylinders in the lean cylinder group ($N_{lean\ cylinders}$) is multiplied by the average cylinder torque output ($Tq_{cylinder,average}$) and is multiplied by a lean torque modifier ($TqMod_{lean}$). The lean torque modifier ($TqMod_{lean}$) may be a predetermined modifier to adjust the average cylinder torque output ($Tq_{cylinder,average}$) based on the amount of lean bias. For example, the lean torque modifier ($TqMod_{lean}$) may be based on the AFR of the lean cylinders of the engine and reference to a function or a look-up table containing data such as is shown at FIG. 6.

To calculate the torque output of the rich group of cylinders, the total number of rich cylinders in the lean cylinder group ($N_{rich\ cylinders}$) is multiplied by the average cylinder torque output ($Tq_{cylinder,average}$) and is multiplied by a rich torque modifier ($TqMod_{rich}$). The rich torque modifier ($TqMod_{rich}$) may be a predetermined modifier to adjust the average cylinder torque output ($Tq_{cylinder,average}$) based on the amount of rich bias. For example, the rich torque modifier ($TqMod_{rich}$) may be based on the AFR of the rich cylinders of the engine and reference to a function or look-up table containing data such as is shown at FIG. 6.

The total toque output of the engine may then be calculated by adding the calculated lean cylinder group torque output ($Tq_{lean\ group}$) and the calculated rich cylinder group torque output ($Tq_{rich\ group}$).

These torque output calculations may be used for determining a current engine torque output in addition to or as an alternative to various sensor outputs (e.g., a profile ignition pickup signal (PIP) from a Hall effect sensor 120 (or other type) coupled to crankshaft 140). For example, these torque output calculations may be used to make adjustments to evaluate torque output in real-time, making adjustments for one or more of air-fuel-ratios of the engine cylinders, a position of an EGR valve, and spark timing.

In at least one example, these output torque calculations may be carried out for each engine cycle so that the controller is updated with the most recent engine operating conditions. However, in some examples, these output torque calculations may be carried out for a subset of the engine cycles during vehicle operation.

As mentioned above, the torque output calculations above may be used as predictive calculations by the controller to calculate the rolling split lambda fueling schedules and the default split lambda fueling schedules discussed below (e.g., at steps 512, 514, 518, 520).

Further, in at least one example, the torque output calculations may additionally take into account whether port fuel injection or direct injection is being used as a further torque modifier. For example, in cases where port fuel injection is used for the rich cylinders and direct injection is used for the lean cylinders, the torque output calculations above may be adjusted by a multiplier. This multiplier may increase the torque output calculations by approximately 5% to 7% in at least one example.

Moving to step 504, based on the estimated and/or measured engine operating conditions at step 502, method 500 includes determining whether the torque demand is greater than a threshold torque demand. In one or more examples, the threshold torque demand may be a function of engine speed. The threshold torque demand may be a pre-calibrated non-zero engine torque value above which the torque cannot be further increased while operating the engine at stoichiometry without risking heat-related degradation to exhaust system components, such as a turbine of the turbocharger (e.g., turbine 165 of FIGS. 2-4) and the emission control device. As mentioned above with respect to FIG. 2, more engine air flow (e.g., higher MAF and/or MAP values) results in more engine power. However, as also mentioned above, this increases the temperature of the exhaust gas produced, and thus, the temperature of the exhaust system components. Therefore, the threshold torque demand may be set based on a threshold exhaust temperature, the threshold exhaust temperature including a pre-calibrated non-zero exhaust temperature value above which exhaust system component degradation may be increased. As an alternative example of the method at 504, it may be determined if the engine power demand is greater than a first threshold power, which may correspond to the threshold torque demand at a given engine speed.

If the torque demand is not greater than the threshold torque demand ("NO"), method 500 proceeds to 506 and includes operating the engine in a stoichiometric mode (also referred to herein as a stoichiometric operating mode). In at least one example, it is noted that the torque output calculations at step 503 may be compared to the torque demand received at step 502. Then, based on a difference between the torque output calculations at step 503 compared to the torque demand received at step 502, a fueling schedule for the stoichiometric mode may be selected and/or created and associated actions may be carried out to achieve the torque demand (e.g., adjusting VCT, actuating fuel injectors, adjusting actuation of spark plugs for spark timing adjustments, adjusting a position of an EGR valve, adjusting a position of an intake throttle, etc.). During operation in the stoichiometric mode, all cylinders of the engine may be operated at a stoichiometric AFR for all engine cycles. Boost may be provided via the turbocharger based on the torque demand. However, boost pressure (e.g., amount of boost) may be limited based on the exhaust temperature, such as to maintain the exhaust temperature below the threshold exhaust temperature. Thus, the boost pressure may be kept below a temperature-limited boost pressure threshold while operating in the stoichiometric mode. As one example, the temperature-limited boost pressure threshold may correspond to the boost pressure for producing the threshold torque demand. During stoichiometric operation, dual injection may be carried out. In at least one example, a minimum pulse width (or minimum PFI fraction and DI fraction) may be required for each DI and PFI injector to avoid deposit build-ups, for purposes of fuel rail temperature control, and for purposes of fuel injector tip temperature control. For example, at least 10% PFI or 10% DI may need to be maintained.

Additionally or alternatively, in at least one example, there may be a choice between carrying out PFI, DI, or a combination of both PFI and DI based on one or more of predicted emissions, knock, engine component temperatures, exhaust gas temperatures, and torque output, for example. For example, a selection between carrying out PFI, DI, or a combination of both PFI and DI may be based on which option is predicted to best reduce one or more of emission and knock.

Following step 506, method 500 may then end. Further, method 500 may be repeated so that the controller may update the operating mode as operating conditions change. For example, the controller may automatically and continuously (e.g., in real-time) repeat at least parts of method 500 so that changes in operating conditions, such changes in the torque demand, may be detected based on signals received from sensors of the engine system and evaluated to determine if the change in operating conditions warrant a change in the engine operating mode.

Returning to 504, if instead the torque demand is greater than the threshold torque demand ("YES"), method 500 proceeds to 508 where it is determined whether dual fuel injection is available. In particular, method 500 includes determining whether both direct injection (DI) and port fuel injection (PFI) is available at step 508.

In some examples, dual fuel injection may only be determined as available ("YES") if all of the cylinders have both DI and PFI availability. However, in other examples, dual fuel injection may be determined on a cylinder by cylinder basis. Thus, in one or more examples, dual fuel injection is determined to be available ("YES") as long as at least one of the cylinders has both DI and PFI availability. Put another way, in at least one example, dual fuel injection may be determined to be available ("YES") responsive to only a subset of the cylinders having dual fuel injection available at step 508. In at least one example, an availability for dual fuel injection may include performing a diagnostic to determine whether each of the direct injectors (e.g., direct injectors 66) and the each of the port fuel injectors (e.g., port fuel injectors 67) are functional. For example, the direct injectors may be commanded to inject an amount of fuel into the cylinders as part of the diagnostic, and a flow meter may be monitored to determine whether the commanded amount of fuel was injected via the direct injectors. Additionally or alternatively, the availability of dual fuel injection may include determining an availability of fuel for each of the direct injectors and port fuel injectors, as a fuel source for each of the direct injectors and the port fuel injectors may be separate in some configurations. For example, the availability of fuel may be based on a fuel level sensor positioned within a direct injector fuel source and based on a fuel level sensor positioned in a port fuel injector fuel source. In at least one example, the direct injectors may be the direct injectors 66 and the port fuel injectors may be the port fuel injectors 67, as illustrated at FIGS. 1-4.

Should both DI and PFI be available at step 508, then it is determined that dual fuel injection is available ("YES") at step 508, and method 508 proceeds to step 510.

At step 510, method 500 includes determining whether or not the engine satisfies rolling split lambda conditions. That is, step 510 includes determining whether the engine is being operated in rolling split lambda conditions. Such rolling split lambda conditions may refer to engine operating conditions (such as speed and load) where the rolling split lambda mode is estimated to achieve less than a threshold NVH and less than a threshold exhaust temperature. The rolling split lambda conditions may be a set of engine operating conditions at which the rolling split lambda mode is calculated to result in NVH less than the threshold NVH and/or reduced exhaust temperatures (such as exhaust temperatures less than the threshold exhaust temperature) compared to operating in the stoichiometric mode or the default split lambda mode.

Put another way, step 510 includes determining whether or not it is optimal to operate the engine in rolling split lambda mode. Method 500 may check if a rolling split lambda fueling schedule reduces NVH compared to a default split lambda schedule. It is noted that such NVH is due at least in part to amplification of the fueling schedule frequency (frequency of the shortest repeating pattern) from resonance. Method 500 may also check if a rolling split lambda fueling schedule reduces exhaust temperature compared to a default split lambda schedule. This is possible in cases where one fueling schedule may allow larger rich and lean biases.

In at least one example, calculating the NVH for operating in the rolling split lambda mode may include comparing current speed load conditions of the engine to an associated resonant frequency region for the rolling split lambda mode on a speed-load map. The resonant frequency region may also be referred to as a resonant frequency condition, in at least one example. The resonant frequency region for the rolling split lambda mode may correspond to engine operating conditions at which NVH greater than an NVH threshold occurs if the engine is operated in the rolling split lambda mode, where the NVH threshold is a non-zero value. Resonance occurs due to driveline frequency resonating with the engine frequency, in at least one example.

Thus, in one or more examples, the determination as to whether or not to operate the engine in the rolling split lambda mode may be based on an engine speed and load. For example, the rolling split lambda mode may correspond to regions II, IV, VI, and VIII illustrated in speed-load map 1000 at FIG. 10A.

As may be seen at FIG. 10A, at low RPM, maximum torque can be achieved with stoichiometric mode (exhaust temperatures are below the acceptable threshold). The load boundary 1028 at the upper boundary of region I corresponds to the torque demand threshold 504 from method 500. At higher RPMs, split lambda may be needed to reduce the temperature, however. As further discussed below, FIG. 10A only includes cases where rolling split lambda mode is used in an RPM range when the torque demand threshold 504 is satisfied, cases where default split lambda mode is used in an RPM range when torque demand threshold 504 is satisfied, and cases where there is a switch between the rolling split lambda mode and the default split lambda mode.

Determination as to whether rolling split lambda mode conditions are present may be based off of a look-up table which takes into account engine speed and load as related to driveline frequency, as well as frequencies associated with the rolling split lambda mode fueling schedule and frequencies associated with the default split lambda mode fueling schedule. It is noted that the rolling split lambda mode conditions are engine operating conditions (such as engine speed and load) in which operating in the rolling split lambda mode is determined to be optimal compared to operation in the default split lambda mode and stoichiometric mode to reduce NVH, exhaust temperature, and emissions, while still achieving a desired torque output.

The look-up table may correspond to such split lambda fueling schedule frequencies and a speed-load map, such as speed-load map 1000 at FIG. 10A, in at least one example. In particular, an estimated/detected engine speed and load may be used as inputs into the look-up table (e.g., inputs into a function of the look-up table) that may be accessed via the controller of the engine system. Then, based on the output, the controller of the engine determines whether the speed and load inputs result in operation in the stoichiometric mode, default split lambda mode or rolling split lambda mode. The engine speed and load conditions as related to whether to operate in the rolling split lambda mode, default split lambda mode, or stoichiometric mode may be empirically predetermined and stored in the look-up table and corresponding speed-load map. The engine speed and load conditions as related to the rolling split lambda mode, default split lambda mode, and stoichiometric may be used to determine an optimal fueling schedule for operating the engine, in at least one example. It is noted that operating in any of the rolling split lambda mode, default split lambda mode, and stoichiometric mode includes carrying out a fueling schedule associated with the rolling split lambda mode, default split lambda mode, and stoichiometric mode, respectively.

Responsive to determining to operate in the rolling split lambda mode ("YES") at step 510, method 500 includes operating the engine in a rolling split lambda mode at step 512. That is, the engine may simultaneously benefit from operating in the rolling split lambda mode while dual fuel injection is available in order for method 500 to carry out step 512.

In the rolling split lambda mode, a fueling schedule of the engine is altered such that a plurality of individual non-stoichiometric engine cycles are carried out while maintaining substantially stoichiometric conditions at an emission control device (e.g., emission control device 70). That is, the exhaust gas at the emission control device may be substantially stoichiometric. In particular, in the rolling split lambda mode, the sum of the engine cycles for the fueling schedule is stoichiometric though the fueling schedule includes a plurality of non-stoichiometric engine cycles.

In order to determine the fueling schedule to use in the split lambda mode at step 512, torque output calculations as discussed above with regard to step 502 may be utilized to perform predictive calculations. For example, the torque output calculations discussed at step 502 may be used as predictive calculations to perform scenario analysis for various combinations of torque modifiers when in the rolling split lambda mode.

In examples where the torque output calculations may be used for predictive purposes, various combinations of potential AFR and spark timing values may be used in conjunction with the above-discussed torque output calculations to perform a scenario analysis. In the case of the rolling split lambda mode, the torque output calculations may specifically be carried out by calculating the torque output for each cylinder separately and then summing the torque outputs together. In this way, factors such as engine balancing may be taken into account when selecting the rolling split lambda fueling schedule.

By carrying out a plurality of non-stoichiometric engine cycles during conditions where the engine is operating in a region where default split lambda fueling schedule excites the engine resonant frequency at step 510, the technical effect of mitigating amplification due to resonance is achieved, and the NVH of the engine is advantageously reduced. Meanwhile, by maintaining overall substantially stoichiometric conditions at the emission control device for the predetermined number of engine cycles, catalyst breakthrough may be avoided.

It is noted that catalyst breakthrough, also referred to as slip, is a condition during which emission control device (e.g., catalyst) activity decreases to the point that NOx and hydrocarbons pass through the emission control device without conversion. Such a decrease in emission control device activity may be due to temperature conditions that are less than a threshold light-off temperature for a catalyst of the emission control device, as well as due to overloading of the emission control device when operating the engine with an overall rich AFR. The light-off temperature may be a temperature at which a catalyst operates at 50% conversion, in at least one example.

Further, as dual fuel injection is available at step 512, port fuel injection (PFI) is used for the rich cylinders and direct injection (DI) is used for lean cylinders of the engine during the rolling split lambda mode at step 512. For example, PFI may be carried out via one or more of the port fuel injectors 67, and DI may be carried out via one or more of the direct injectors 66. In cases where dual fuel injection is determined to be available at step 508 because all of the cylinders have dual fuel injection availability, all of the cylinders may be operated with PFI for the rich cylinders and DI for the lean cylinders. In cases where dual fuel injection is determined to be available at step 508 because a portion of the cylinders has dual fuel injection availability (and not all of the cylinders have dual fuel injection), the portion of the cylinders with dual fuel injection availability is controlled with PFI when operated rich and DI when lean. The remaining cylinders which do not have dual fuel injection availability may be operated with either only PFI or only DI (whichever is available).

PFI and DI may produce different torques based on which injection systems are being used. One reason for the torque difference is due to the charge cooling effect produced by DI, which can produce 5%-7% more torque. Such differences in torque production may be accounted for in the predictive torque output calculations for the rolling split lambda mode at step 512.

In view of the above, by using PFI for the rich cylinders and DI for the lean cylinders at step 512, the lean cylinders will benefit from charge cooling and the torques produced by the lean cylinders will more closely match the torque produced by the rich cylinders. In turn, engine balance may be achieved and NVH is avoided when using varied AFRs for the cylinders during an engine cycle.

Looking briefly to FIGS. 8A-8D, example rolling split lambda fueling schedules are shown. It is noted that the fueling schedules disclosed herein (including the rolling split lambda fueling schedules) may not only be directed towards commands for commanding a fuel injector and controlling a fueling injection amount. Rather, the fueling schedules herein may encompass commands associated with various torque modifiers. For example, the fueling schedules herein may be used to adjust one or more actuators, which in turn adjusts various torque modifiers. For example, one or more of the throttle, direct fuel injectors, port fuel injectors, EGR valve, and spark plugs may adjusted based on the fueling schedule to in turn adjust one or more torque modifiers. Such one or more torque modifiers may include AFR and spark, for example. EGR may additionally be taken into account as a separate torque modifier, in at least one example. However, EGR may alternatively be included in the AFR torque modifier.

As to the rolling split lambda fueling schedules discussed at FIGS. 8A-8D, these rolling split lambda fueling schedules may be selected and/or created via the torque output calculations discussed at step 503. For example, the rolling split lambda fueling schedules may be selected and/or created via the use of the torque output calculations discussed at step 503 to perform a scenario analysis for various torque output modifiers. In at least one example, it is noted that the torque output calculations at step 503 may be compared to the torque demand received at step 502. Then, based on a difference between the torque output calculations at step 503 compared to the torque demand received at step 502, rolling split lambda fueling schedules may be selected and/or created and actions associated with the rolling split lambda fueling schedules may be carried out (e.g., adjusting VCT, actuating fuel injectors, adjusting actuation of spark plugs for spark timing adjustments, adjusting a position of an EGR valve, adjusting a position of an intake throttle, etc.).

In the case of the rolling split lambda fueling schedules, the first approach discussed for torque output calculations (where individual cylinder torque outputs are calculated and then summed) may be advantageous. However, it is also possible to utilize the second approach for calculating the torque output discussed at step 503, which includes grouping the rich and lean cylinders for the calculations.

In some examples, the scenario analysis may be used to evaluate a plurality of predetermined rolling split lambda fueling schedules and select one of the predetermined rolling split lambda fueling schedules. Additionally or alternatively, the scenario analysis may be used to create custom rolling split lambda fueling schedules in real-time. For example, should none of the predetermined rolling split lambda fueling schedules be acceptable based on one or more criteria, a custom rolling split lambda fueling schedule may be created in real-time via the torque output calculations.

Performing the scenario analysis may include carrying out multiple torque output calculations with various combinations of potential torque modifiers. For example, the torque output calculations for various potential combinations of spark timing and AFRs may be calculated. In some examples, the torque output for the various combinations of spark timing and AFRs may be evaluated at least in part by referencing a look-up table including AFR and spark timing data relative to torque output, such as illustrated at FIGS. 6 and 7.

In at least one example, the scenario analysis may compile predictive data for various combinations of spark timing and AFRs for each cylinder in an engine cycle for a series of multiple engine cycles. The scenario analysis may further include compiling predictive data for these various combinations of spark timing and AFRs for a series of multiple engine cycles. This predictive data may include one or more of an overall predicted torque output for the engine, a predicted engine speed, a predicted torque output for each cylinder of the engine, a predicted exhaust AFR, and a predicted amount of catalyst loading for each of the spark timing and AFR combinations, for example.

Referencing the predictive data, selection of the rolling split lambda fueling schedule may then be carried out based on one or more criteria. For example, chosen AFRs and spark timings for the rolling split lambda fueling schedule may be to prevent excessive exhaust temperatures (exhaust temperatures exceeding a temperature threshold). Such excessive exhaust temperatures may be caused by one or more of smaller rich and lean biases, and larger spark retards increase exhaust temperature.

Additionally or alternatively, the chosen AFRs of the rolling split lambda fueling schedule using a rich-lean fueling pattern may avoid catalyst breakthrough. It is noted that larger rich and lean biases, and longer sequences of consecutive rich cylinders or consecutive lean cylinders increase the risk of catalyst breakthrough.

Further, in at least one example, the chosen AFRs, spark timings, and rich-lean fueling pattern of the rolling split lambda fueling schedule may result in acceptable NVH (NVH less than the NVH threshold). Different rich-lean fueling patterns have different frequencies, and frequencies closer to resonant frequency increase NVH. Larger rich and lean biases lead to larger torque fluctuations between rich and lean cylinders and potentially higher NVH. Assigning different spark timings to rich and lean cylinders can increase or decrease a torque discrepancy between rich and lean cylinders, leading to higher or lower NVH. Thus, the selection of the rolling split lambda fueling schedule may take into account the impacts of the AFRs, spark timings, and rich-lean fueling pattern on NVH.

Further still, the chosen AFRs and spark timings for the rolling split lambda fueling schedule may be able to achieve the demanded torque.

Thus, the one or more criteria for selection of the rolling split lambda fueling schedule may include one or more of a demanded torque output, a predicted exhaust temperature, a catalyst breakthrough threshold, a threshold amount of torque modulation, an engine balancing threshold, estimated NVH, and a fuel efficiency. In at least one example, if multiple fueling schedules satisfy all the criteria, then the fueling schedule with the lowest fuel consumption or lowest NVH may be chosen.

Figure 8A:
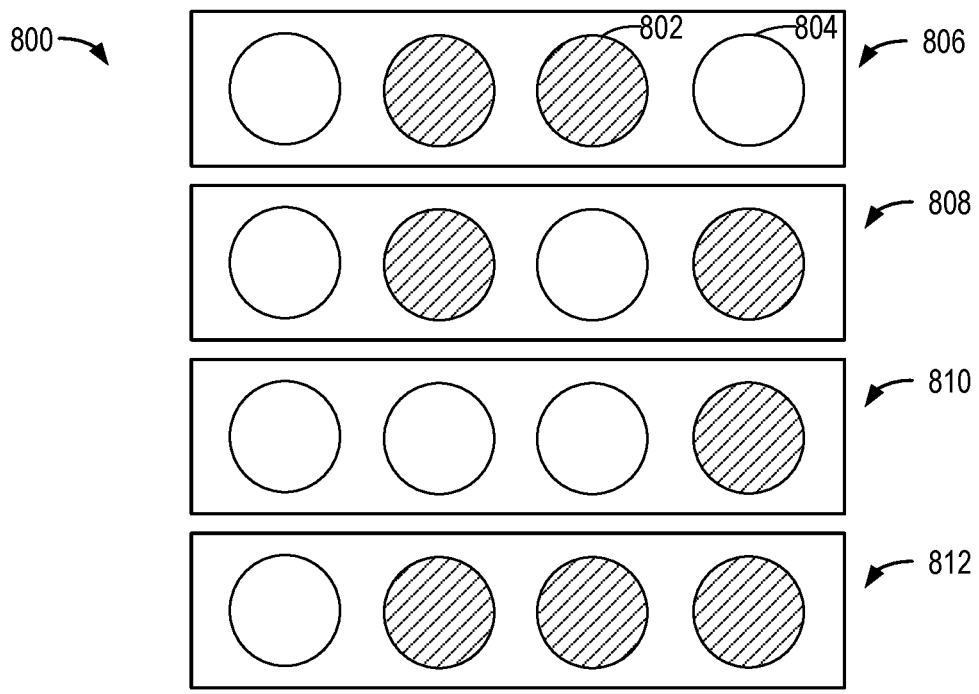
FIG. 8A shows a schematic illustration of a first rolling split lambda schedule according to at least one example of the present disclosure.

Turning first to FIG. 8A, a first rolling split lambda fueling schedule 800 is shown. In the first rolling split lambda fueling schedule 800, rich cylinders 802 are denoted via the circles with hatching and lean cylinders 804 are denoted via solid circles. The first rolling split lambda fueling schedule 800 is a four engine cycle fueling schedule, including a first engine cycle 806, a second engine cycle 808, a third engine cycle 810, and a fourth engine cycle 812. Completion of each fueling cycle for the first rolling split lambda fueling schedule 800 thus includes one completion of each of the first engine cycle 806, the second engine cycle 808, the third engine cycle 810, and the fourth engine cycle 812. In at least one example, the engine cylinders shown may be all of the cylinders of the engine. Alternatively, the engine cylinders shown may be one of two cylinder banks. Further, in the example shown at FIG. 8A, four cylinders are shown, though other numbers of cylinders are possible. In at least one example, a firing order of the cylinders is maintained.

In the first example rolling split lambda fueling schedule 800, it is noted that each of the rich cylinders 802 are operated at a percentage rich that is equal to a percentage lean of each of the lean cylinders 804. By operating the rich cylinders 802 at a percentage rich equal to the percentage lean of the lean cylinders 804, overall stoichiometry is achieved at the completion of each fueling cycle while modulating the torque to avoid resonance issues.

Using PFI in comparison to DI may result in changes in the cylinder trapped mass which can affect the torque calculations. Operation in PFI or DI also can affect knock, which is accounted for in the torque calculation through the spark modifier.

When using PFI for rich cylinders and DI for lean cylinders, as discussed in at least one example herein, some adjustments for transient fueling may be necessary to account for fuel puddling during rolling split lambda operation.

For example, consider a cylinder alternating rich and lean from cycle to cycle. In such a case, if PFI is scheduled for this cylinder every other cycle, fuel in the puddle has twice the time to evaporate between injections (and part of the fuel that evaporated would go into the lean cycle, so the DI amount calculations are adjusted to account for such puddling).

Furthermore, fueling schedules may result in some rich cycles being preceded by rich cycles or lean cycles (for the same cylinder), which may result in changes in the size of the fuel puddle among the rich cycles. Fuel puddling is also accounted for when switching between stoichiometric mode and the split lambda mode, as the manifold pressure may change. For example, one or more of fuel injection and VCT may be adjusted to compensate for such manifold pressure changes.

For example, each of the rich cylinders 802 may be operated at 20% rich (a phi value of 1.20) and each of the lean cylinders 804 may be operated at 20% lean (a phi value of 0.80) where phi ($\varphi$)=1/lambda.

In other words, to maintain overall stoichiometry, the rich lambda should be 0.83 and the lean lambda should be 1.25. The overall lambda of multiple cylinders (with equal mass flow rate) is not the average of individual cylinder lambda, therefore: $\lambda=1+x$ and $\lambda=1-x$ do not result in a stoichiometric mixture unless x (where x is the bias) is small. Instead, the overall phi of multiple cylinders is the average of the individual cylinder phi: $\varphi=1+x$ and $\varphi=1-x$ result in a stoichiometric mixture.

Put another way, for exemplary purposes, consider a first cylinder with doubled fueling ($\lambda=0.5$, $\varphi=2$), and a second cylinder with no fueling ($\lambda=\infty$, $\varphi=0$). The overall $\lambda$ and $\varphi$ should both be 1, but averaging $\lambda$ would result in $\infty$.

Or, in another example, each of the rich cylinders 802 may be operated at 15% rich (a phi value of 1.15) and each of the lean cylinders 804 may be operated at 15% lean (a phi value of 0.85).

Further percentage amounts for rich and lean are possible without departing from the scope of this disclosure, so long as the percentage used for the rich cylinders 802 and the lean cylinders 804 is below an emission control device breakthrough percentage and achieves stoichiometry at the completion of each schedule. That is, the particular percentage rich and percentage lean used in the operation of the cylinders for the first example rolling split lambda fueling schedule 800 are selected such that completion of each fueling schedule avoids emission control device breakthrough and achieves substantially stoichiometric conditions at the emission control device.

In the first example rolling split lambda fueling schedule 800, the first engine cycle 806 and the second engine cycle 808 are stoichiometric, while the third engine cycle 810 and the fourth engine cycle 812 are non-stoichiometric. In particular, the third engine cycle 810 is lean and the fourth engine cycle 812 is rich, where an amount that third engine cycle 810 is enleaned is a same amount as the fourth engine cycle 812 is enriched. For example, if the third engine cycle 810 results is an overall 20% lean engine cycle, then the fourth engine cycle 812 is an overall 20% rich engine cycle. In this way, after one completion of each of the first engine cycle 806, second engine cycle 808, third engine cycle 810, and fourth engine cycle 812, the first example rolling split lambda fueling schedule 800 results in substantially stoichiometric conditions at an emission control device downstream from the engine cylinders. Based on averages, however, it is noted that the 20% rich and 20% lean cylinders example mentioned previously may result in engine cycle 810 being 10% lean (average of +20%, +20%, +20%, −20% lean) and engine cycle 812 being 10% rich (average of −20%, +20%, +20%, +20% rich). In one or more examples, an order of the engine cycles in the first example rolling split lambda fueling schedule 800 may be altered. Moreover, which cylinders are rich and which cylinders are lean within each engine cycle may be adjusted without departing from the scope of this disclosure. The inclusion of the non-stoichiometric cycles in the first example rolling split lambda fueling schedule 800 modulates the engine torque and is particularly advantageous to avoid resonance issues. That is, by modulating the engine torque, an amount of time that the engine is operated at speeds which cause driveline resonance may be avoided to reduce overall driveline NVH.

Figure 8B:
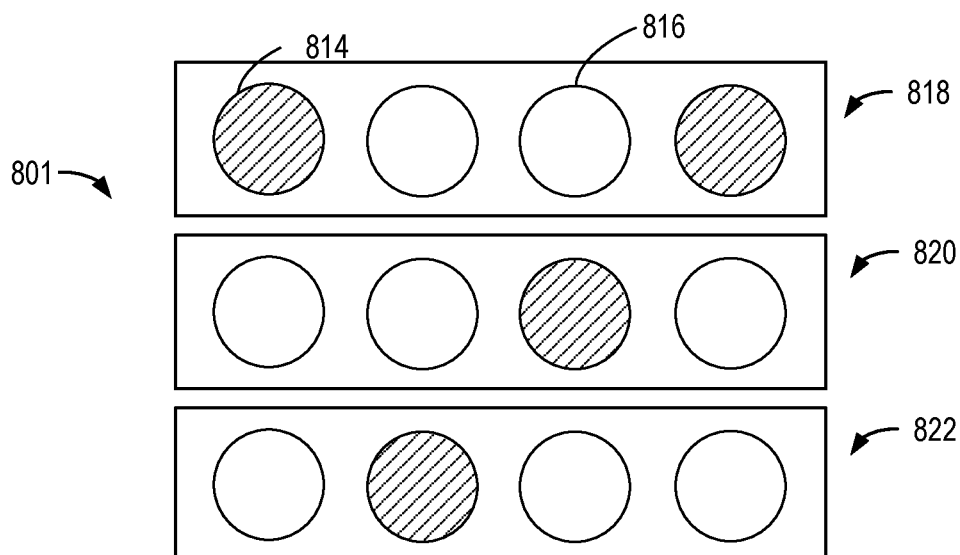
FIG. 8B shows a schematic illustration of a second rolling split lambda schedule according to at least one example of the present disclosure.

Turning to FIG. 8B, FIG. 8B shows a second example rolling split lambda fueling schedule 801. In the second rolling split lambda fueling schedule 801, rich cylinders 814 are denoted via the circles with hatching and lean cylinders 816 are denoted via solid circles. The first rolling split lambda fueling schedule 801 is a three engine cycle fueling schedule, including a first engine cycle 818, a second engine cycle 820, and a third engine cycle 822. Completion of each fueling cycle for the second rolling split lambda fueling schedule 801 thus includes one completion of each of the first engine cycle 818, the second engine cycle 820, and the third engine cycle 822. Further, in the example shown at FIG. 8B, four cylinders are shown, though other numbers of cylinders are possible. In at least one example, a firing order of the cylinders is maintained.

In the second example rolling split lambda fueling schedule 801, it is noted that each of the rich cylinders 814 are operated at a percentage rich that is twice a percentage lean of each of the lean cylinders 816. By operating the rich cylinders 814 at percentage rich twice the percentage lean of the lean cylinders 816, overall stoichiometry is achieved at the completion of each fueling cycle while modulating the torque to avoid resonance issues.

Further percentage amounts for rich and lean are possible without departing from the scope of this disclosure, so long as the percentage used for the rich cylinders 814 and the lean cylinders 816 is below an emission control device (e.g., catalyst) breakthrough percentage and achieves stoichiometry at the completion of each schedule. That is, the particular percentage rich and percentage lean used in the operation of the cylinders for the second example rolling split lambda fueling schedule 801 are selected such that completion of each fueling schedule avoids emission control device breakthrough and achieves substantially stoichiometric conditions at the emission control device upon completion. In at least one example, emission control device breakthrough may be referred to as catalyst breakthrough.

In the second example rolling split lambda fueling schedule 801, none of the engine cycles are stoichiometric. That is, each of the engine cycles in the second example rolling split lambda fueling schedule 801 are non-stoichiometric. In particular, the first engine cycle 818 is a rich engine cycle. The second engine cycle 820 and the third engine cycle 822 are lean engine cycles.

In a case where the rich engine cylinders 814 are operated at 20% rich (a phi value of 1.20) and the lean cylinders 816 are operated at 10% lean (a phi value of 0.90), the first engine cycle 818 may thus be 5% rich (an average of +20%, −10%, −10%, and +20% rich); the second engine cycle 820 2.5% lean; and the third engine cycle 822 2.5% lean.

In at least one example, engine cycles of the second example rolling split lambda fueling schedule 801 may be carried out in a different order. Further, the cylinders shown in the second example rolling lambda fueling schedule 801 may represent all of the cylinders of the engine. Or, alternatively, the cylinders shown in the second example rolling split lambda fueling schedule 801 may represent one of two cylinder banks of the engine. In cases where the engine comprises two cylinder banks, the second example rolling split lambda fueling schedule 801 may be coordinated with the other cylinder bank to avoid emission control device breakthrough while still modulating the torque to avoid resonance issues. In one or more examples, the first example rolling lambda fueling schedule may be used for a first cylinder bank and the second example rolling lambda fueling schedule may be used for a second cylinder bank.

Figure 8C:
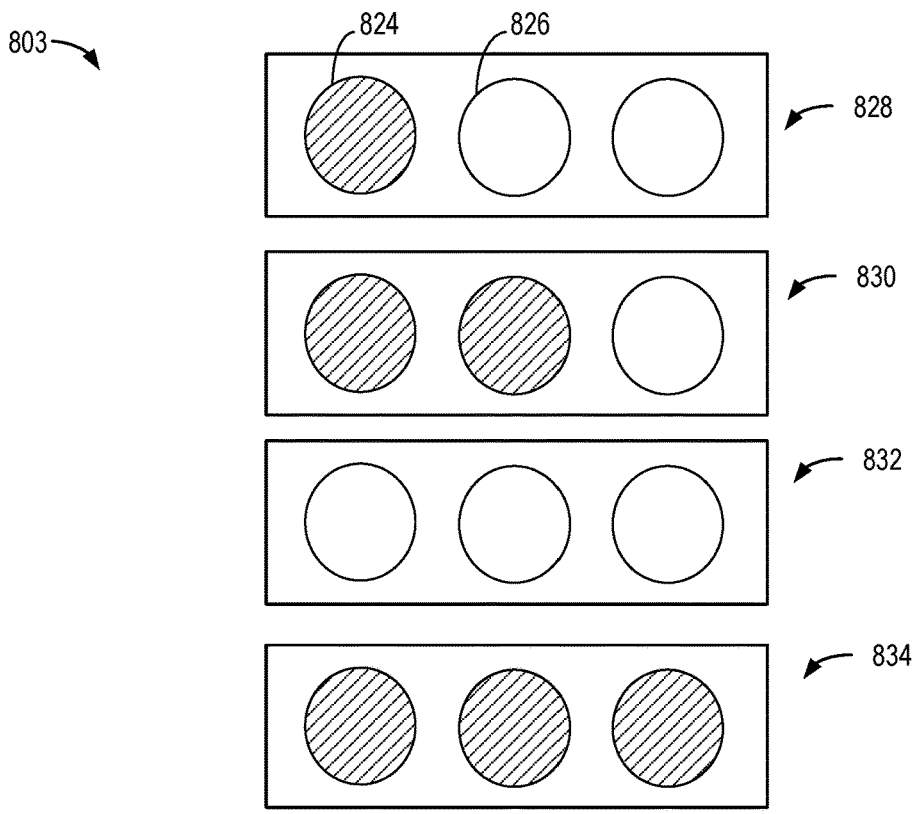
FIG. 8C shows a schematic illustration of a third rolling split lambda schedule according to at least one example of the present disclosure.

Turning to FIG. 8C, FIG. 8C shows a third example rolling split lambda fueling schedule 803. In the third rolling split lambda fueling schedule 803, rich cylinders 824 are denoted via the circles with hatching and lean cylinders 826 are denoted via solid circles. The third rolling split lambda fueling schedule 803 is a four engine cycle fueling schedule, including a first engine cycle 828, a second engine cycle 830, a third engine cycle 832, and a fourth engine cycle 834. Completion of each fueling cycle for the third rolling split lambda fueling schedule 803 thus includes one completion of each of the first engine cycle 828, the second engine cycle 830, the third engine cycle 832, and the fourth engine cycle 834. Further, in the example shown at FIG. 8C, three cylinders are shown, though other numbers of cylinders are possible. In at least one example, a firing order of the cylinders is maintained.

In the third example rolling split lambda fueling schedule 803, it is noted that each of the rich cylinders 824 are operated at a percentage rich that is equal to a percentage lean of each of the lean cylinders 826. This being the case, as there are an odd number of cylinders, each of the first engine cycle 828, the second engine cycle 830, the third engine cycle 832, and the fourth engine cycle 834 of the third example rolling split lambda fueling schedule 803 are non-stoichiometric engine cycles. However, in following the third example rolling split lambda fueling schedule, operating the rich cylinders 824 at a percentage rich equal to the percentage lean of the lean cylinders 826, achieves substantially stoichiometric conditions at the emission control device upon one completion of each of the first, second, third, and fourth engine cycles of the third example rolling split lambda fueling schedule 803 while modulating the torque to avoid resonance issues.

For example, each of the rich cylinders 824 may be operated at 20% rich (a phi value of 1.20) and each of the lean cylinders 826 may be operated at 20% lean (a phi value of 0.80). Or, in another example, each of the rich cylinders 824 may be operated at 15% rich (a phi value of 1.15) and each of the lean cylinders 826 may be operated at 15% lean (a phi value of 0.85).

Further percentage amounts for rich and lean are possible without departing from the scope of this disclosure, so long as the percentage used for the rich cylinders 824 and the lean cylinders 826 is below an emission control device breakthrough percentage and achieves stoichiometry at the completion of each schedule. That is, the particular percentage rich and percentage lean used in the operation of the cylinders for the third example rolling split lambda fueling schedule 803 are selected such that completion of each fueling schedule avoids emission control device breakthrough and achieves substantially stoichiometric conditions at the emission control device.

As mentioned above, in the third example rolling split lambda fueling schedule 803, none of the engine cycles are stoichiometric. Rather, all of the engine cycles are non-stoichiometric. In particular, the first engine cycle 828 and the third engine cycle 832 are lean, and the second engine cycle 830 and the fourth engine cycle 834 are rich. It is noted that an amount the engine is enleaned is equal to an amount that the engine is enriched upon completion of the first engine cycle 828, second engine cycle 830, third engine cycle 832, and fourth engine cycle 834.

In one or more examples, it is noted that lean to rich alternation may not be cycle to cycle and that smaller portions of a cycle may be alternating. For example, to minimize the risk of catalyst breakthrough, a shortest alternating pattern, or shortest sequences of consecutive rich cylinders or consecutive lean cylinders available, may be selected.

For example, though the above-discussed sequence alternates rich and lean cycles, the above sequence results in four consecutive lean cylinders and four consecutive rich cylinders. In at least one example, the schedule shown at FIG. 8C may instead carry out the fueling pattern shown in a different order. That is, rather than third rolling split lambda fueling schedule 803 carrying out the engine cycle fueling in order of first engine cycle 828, second engine cycle 830, third engine cycle 832, and then fourth engine 834 as shown, the third rolling split lambda fueling schedule may instead be carried out with a fueling order of first engine cycle 828, second engine cycle 830, fourth engine cycle 834, and then third engine cycle 832. By switching the order of the third engine cycle 832 and the fourth engine cycle 834 fueling in this way, the result is a fueling cycle that alternates rich and lean every 2 cycles, and the longest sequence of consecutive rich or lean cylinders is reduced to three which may advantageously reduce catalyst breakthrough risk.

Further still, in at least one example, a better fueling cycle from a catalyst breakthrough standpoint may be to have the rich cylinders (R) and lean cylinders (L) as follows: [(RRL)-(LRR)-(LLR)-(RLL)]. It is noted that each set of three cylinders in parentheses represents one engine cycle and that the entire sequence is in brackets. Thus, [(RRL)-(LRR)-(LLR)-(RLL)] represents the rich and lean bias and order of four engine cycles. In following this sequence, fueling cycles alternate rich and lean every two cycles, and the longest sequence of consecutive rich or lean cylinders is reduced to two.

Continuing, an even further variation which achieves event further advantages from a catalyst breakthrough standpoint is: [(RLR)-(LRL)]. In this way, the longest sequence of consecutive rich or lean cylinders is reduced to one. Nonetheless, even though this variation may be better from a catalyst breakthrough standpoint, as has been discussed throughout the disclosure, other factors such as NVH may impact the final selection of the fueling schedule. For example, the [(RLR)-(LRL)] sequence has double the frequency of [(RRL)-(LRR)-(LLR)-(RLL)]. Thus, one of [(RLR)-(LRL)] and [(RRL)-(LRR)-(LLR)-(RLL)] may be preferable from an NVH perspective. The preferred fueling cycle (based on NHV) may vary with engine operating condition.

Moreover, which cylinders are rich and which cylinders are lean within each engine cycle may be adjusted without departing from the scope of this disclosure. That is, in FIG. 8C, the first engine cycle 828 is shown with the far left cylinder as a rich cylinder 824. However, in other examples, the middle cylinder or the right cylinder may be the rich cylinder 824.

Figure 8D:
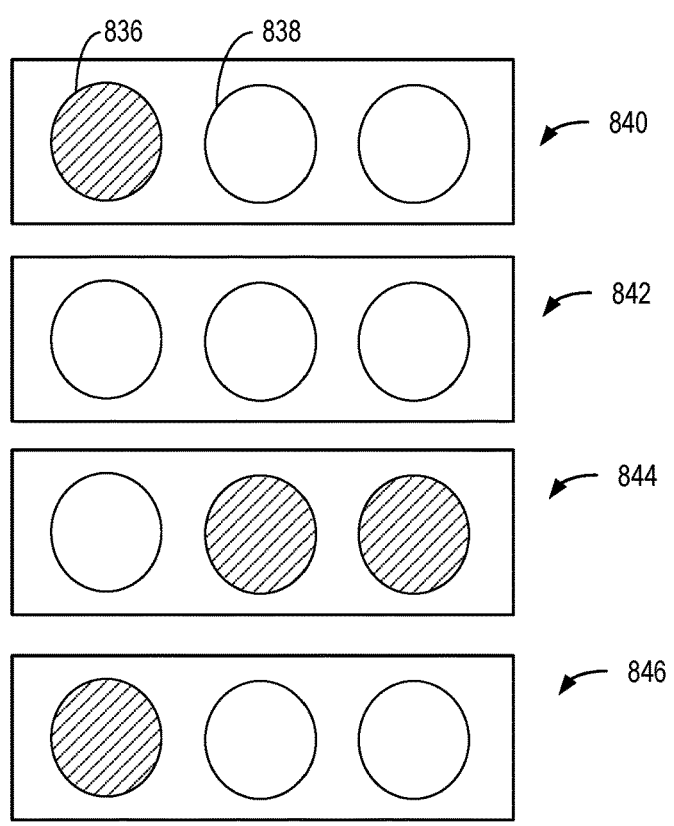
FIG. 8D shows a schematic illustration of a fourth rolling split lambda schedule according to at least one example of the present disclosure.

Turning to FIG. 8D, FIG. 8D shows a fourth example rolling split lambda fueling schedule 805. In the fourth rolling split lambda fueling schedule 805, rich cylinders 836 are denoted via the circles with hatching and lean cylinders 838 are denoted via solid circles. The fourth rolling split lambda fueling schedule 805 is a four engine cycle fueling schedule, including a first engine cycle 840, a second engine cycle 842, a third engine cycle 844, and a fourth engine cycle 846. Completion of each fueling cycle for the fourth rolling split lambda fueling schedule 805 thus includes one completion of each of the first engine cycle 840, the second engine cycle 842, the third engine cycle 844, and the fourth engine cycle 846. Further, in the example shown at FIG. 8D, three cylinders are shown, though other numbers of cylinders are possible. In at least one example, a firing order of the cylinders is maintained.

In the fourth example rolling split lambda fueling schedule 805, it is noted that each of the rich cylinders 836 are operated at a percentage rich that is twice a percentage lean of each of the lean cylinders 838. In following the fourth example rolling split lambda fueling schedule, operating the rich cylinders 836 at a percentage rich twice the percentage lean of the lean cylinders 838, substantially stoichiometric conditions are achieved at the emission control device upon completion of each fueling cycle while modulating the torque to avoid NVH from resonance issues.

For example, each of the rich cylinders 836 may be operated at 20% rich (a phi value of 1.20) and each of the lean cylinders 838 may be operated at 10% lean (a phi value of 0.90). Further percentage amounts for rich and lean are possible without departing from the scope of this disclosure, so long as the percentage used for the rich cylinders 836 and the lean cylinders 838 is below an emission control device breakthrough percentage and achieves stoichiometry at the completion of each schedule. That is, the particular percentage rich and percentage lean used in the operation of the cylinders for the fourth example rolling split lambda fueling schedule 805 are selected such that completion of each fueling schedule avoids emission control device breakthrough and achieves substantially stoichiometric conditions at the emission control device.

The fourth example rolling split lambda fueling schedule 805 includes both stoichiometric and non-stoichiometric engine cycles. In particular, the first engine cycle 840 and the fourth engine cycle 846 are stoichiometric engine cycles, while the second engine cycle 842 and the third engine cycle 844 are non-stoichiometric engine cycles. Specifically, the second engine cycle 842 is lean and the third engine cycle 844 is rich, with a percentage lean of the second engine cycle 842 equal to a percentage rich of the third engine cycle 844. Because the percentage lean of the second engine cycle 842 and the percentage rich of the third engine cycle 844 are equal, the second engine cycle 842 and the third engine cycle 844 average to stoichiometry. For example, the number of rich cylinders included in both the second engine cycle 842 and the third engine cycle 844 is one half of the number of lean cylinders included in both the second engine cycle 842 and the third engine cycle 844. Because the rich cylinders are twice as rich as the lean cylinders are lean, one rich cylinder compensates for one lean cylinder to bring the average exhaust gas AFR to stoichiometry across the second engine cycle 842 and the third engine cycle 844. As a result, the fourth example rolling split lambda fueling schedule 805 achieves substantially stoichiometric conditions at the emission control device over the four engine cycle fueling schedule.

In cases where the rich cylinders 836 are operated at 20% rich and the lean cylinders 838 are operated at 10% lean, the first engine cycle 840 may be stoichiometric; the second engine cycle 842 may be 10% lean; the third engine cycle 844 may be 10% rich; and the fourth engine cycle 846 may be stoichiometric.

In at least one example, an order of the engine cycles in the fourth example rolling split lambda fueling schedule 805 may be altered. Moreover, which cylinders are rich and which cylinders are lean within each engine cycle may be adjusted without departing from the scope of this disclosure. That is, in FIG. 8D, the first engine cycle 840 is shown with the far left cylinder as a rich cylinder 836. However, in other examples, the middle cylinder or the right cylinder may be the rich cylinder 836.

It is noted that the optimal rolling split lambda fueling schedule would be the one that results in the lowest exhaust temperature (to allow higher engine loads at higher engine speeds) while meeting both predetermined emissions requirements (to avoid catalyst breakthrough and achieve stable combustion) and predetermined NVH requirements.

To maximize the exhaust temperature reduction, approximately equal rich and lean biases may be selected since exhaust temperature is roughly symmetric around stoichiometry. For example, a 20% rich and 20% lean bias may drop exhaust temperature by around 75° C. Thus, a schedule with an equal number of 20% rich and 20% lean cylinders will reduce exhaust temperature by 75° C.

Similarly, a 10% lean bias may drop exhaust temperature by around 30° C. So a fueling cycle with one 20% rich cylinder, and two 10% lean cylinders will drop exhaust temperatures by an average of 45° C.

Therefore, if possible, a schedule with equal rich and lean bias may be chosen. But if combustion stability concerns do not allow lean biases as large as rich biases (for example, a 20% lean bias may result in poor combustion stability if used along with EGR), then unequal rich and lean biases may be selected instead of restricting both rich and lean biases. For example, a 20% rich engine cycle, 10% lean engine cycle, and 10% lean engine cycle fuel schedule results in a lower exhaust temperature than a 10% rich engine cycle and 10% lean engine cycle fuel schedule.

Also, choosing an unequal rich and lean bias changes the NVH characteristics. First, a larger rich bias than lean bias may reduce the discrepancy between rich cylinder torque and lean cylinder torque. Second, an unequal rich and lean bias may excite different frequencies (for example a 20% rich engine cycle, 10% lean engine cycle, 10% lean engine cycle repeats every 3 firing events. A 10% rich engine cycle and 10% lean engine (or 20% rich engine and 20% lean engine cycle) only repeats every two firing events. Thus, for the same pair of chosen rich and lean biases for the engine cycles (example 20% rich and 20% lean), several fueling schedules exist which can excite different frequencies. For example, an alternating one rich cylinder and one lean cylinder fueling RLRL . . . schedule has double the frequency of a two rich cylinders and then two lean cylinders fueling schedule RRLLRRLL . . . . Further still, a fueling schedule which carries out one rich cylinder, and then two lean cylinders RLLRLL . . . excites another frequency that is ⅔ of the one rich cylinder and one lean cylinder RLRL . . . fueling schedule, which would not be possible to achieve with equal rich and lean biases.

Therefore, one fueling schedule may be selected if it avoids exciting engine resonant frequencies or frequencies causing NVH greater than a threshold. Further, it may be possible for the default split lambda to have better NVH at some engine operating conditions, while one or more of the rolling split lambda options may have better NVH characteristics at other engine operating conditions.

Further, to minimize the risk of catalyst breakthrough, shorter repeating patterns with shorter sequences of consecutive rich cylinders or consecutive lean cylinders may be selected in at least one example. For example, an alternating one rich cylinder and one lean cylinder fueling schedule RLRL . . . with equal rich and lean biases may be selected over a two rich cylinders, and two lean cylinders RRLLRRLL . . . fueling schedule pattern using same rich and lean biases. The alternating one rich cylinder and one lean cylinder fueling schedule RLRL . . . with equal rich and lean biases may also be selected over or a fueling schedule of one rich cylinder, and then two lean cylinders pattern RLLRLL . . . having a rich bias twice as large as the lean bias may further be preferable over a fueling schedule such as RRLLLLRRLLLL . . . using the same rich and lean biases.

Turning back now to step 512 at FIG. 5, after operating the engine in the rolling split lambda mode (such as illustrated at FIGS. 8A-8D) with PFI for the rich cylinders and DI for the lean cylinders, method 500 may end.

Turning back now to step 510 at FIG. 5, if rolling split lambda mode is determined not to be optimal for NVH and/or exhaust temperature reduction ("NO"), then method 500 includes operating the engine in a default split lambda mode with PFI for rich cylinders and DI for lean cylinders at step 514. That is, the engine may simultaneously not benefit from operating in rolling split lambda mode while dual fuel injection is available in order for method 500 to carry out step 514. PFI and DI may be carried out in a similar manner at step 514 as described in relation to step 512 and may achieve similar advantages.

Operation in the default split lambda mode may include a default split lambda mode fueling schedule. The default split lambda mode fueling schedule operates the engine with at least one non-stoichiometric cylinder per engine cycle while maintaining substantially stoichiometric conditions at the emission control device for each engine cycle. That is, in contrast to the rolling split lambda mode where individual engine cycles are non-stoichiometric, the default split lambda fueling schedule maintains substantially stoichiometric conditions at the emission control device for each engine cycle.

Looking briefly to FIGS. 9A-9D, example default split lambda mode fueling schedules are shown. It is noted that the particular cylinders operated rich and operated lean in the default split lambda fueling schedules are for exemplary purposes and may be altered without departing from the scope of the present disclosure. For example, the two middle cylinders are illustrated as operating rich and the two end cylinders are illustrated as operating lean in FIG. 9A. However, in one or more examples, the two middle cylinders may instead be operated lean and the end cylinders may be operated rich, or every other cylinder may be operated rich in FIG. 9A, so long as overall stoichiometry is maintained. Further still, the particular cylinders operated rich or lean may be changed from engine cycle to engine cycle, so long as overall stoichiometry is maintained. For example, using FIG. 9A as an example once again, the two middle cylinders may be operated rich and the two end cylinders may be operated lean for a first engine cycle in accordance with the first default split lambda fueling schedule 900. Then, still following the first default split lambda fueling schedule 900, the two middle cylinders may be operated lean and the two end cylinders may be operated rich for a second engine cycle. Changing which particular cylinders are operated rich and which cylinders are operated lean from engine cycle to engine cycle may advantageously help to avoid issues such as soot buildup, for example. Similar changes also apply to the examples shown at FIGS. 9B-9D.

Further, similar to step 512, at step 514 the torque output calculations at step 503 may be compared to the torque demand received at step 502. Then, based on a difference between the torque output calculations at step 503 compared to the torque demand received at step 502, default split lambda fueling schedules may be selected and/or created and actions associated with the default split lambda fueling schedules may be carried out at step 514 (e.g., adjusting VCT, actuating fuel injectors, adjusting actuation of spark plugs for spark timing adjustments, adjusting a position of an EGR valve, adjusting a position of an intake throttle, etc.).

Figure 9A:
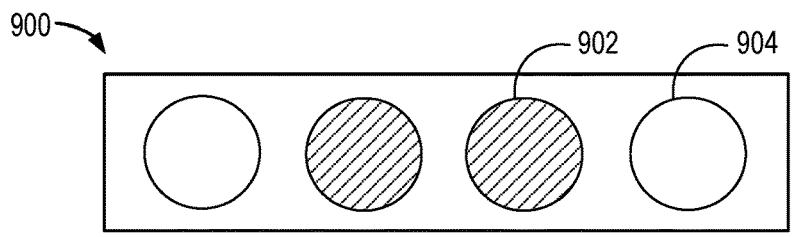
FIG. 9A shows a schematic illustration of a first default split lambda schedule according to at least one example of the present disclosure.

Turning now to FIG. 9A, a first default split lambda fueling schedule 900 is shown. The first default split lambda fueling schedule 900 is a one engine cycle fuel schedule. In the first default split lambda fueling schedule 900, rich cylinders 902 are denoted via the circles with hatching and lean cylinders 904 are denoted via solid circles. The first default split lambda fueling schedule 900 is for a four cylinder engine.

In the first default split lambda fueling schedule 900, it is noted that each of the rich cylinders 902 are operated at a percentage rich that is equal to a percentage lean of each of the lean cylinders 904. By operating the rich cylinders 902 at a percentage rich equal to the percentage lean of the lean cylinders 904, overall stoichiometry is achieved at the completion of each engine cycle.

For example, each of the rich cylinders 902 may be operated at 20% rich (a phi value of 1.20) and each of the lean cylinders 904 may be operated at 20% lean (a phi value 0.80). Or, in another example, each of the rich cylinders 902 may be operated at 15% rich (a phi value of 1.15) and each of the lean cylinders 904 may be operated at 15% lean (a phi value of 0.85).

Further percentage amounts for rich and lean are possible without departing from the scope of this disclosure, so long as the percentage used for the rich cylinders 902 and the lean cylinders 904 achieves stoichiometry at the completion of each engine cycle. That is, the particular percentage rich and percentage lean used in the operation of the cylinders for the first default split lambda fueling schedule 900 are selected such that completion of each engine cycle achieves substantially stoichiometric conditions at the emission control device. In this way, cooling advantages due to the non-stoichiometric operation of the cylinders is achieved while maintaining overall stoichiometric conditions at the emission control device. Moreover, though illustrated as one bank, it is noted that in at least one example the cylinders at FIG. 9A may be a first bank of a two bank engine configuration. In such examples where the cylinders shown at FIG. 9A are a first engine cylinder bank of a two engine cylinder bank configuration, the second engine cylinder bank may also be operated so that the second engine cylinder bank is overall stoichiometric.

While the first default split lambda fueling schedule 900 is shown with half of the cylinders operated rich and half of the cylinders operated lean, it is noted that there may be an unequal number of rich and lean cylinders, in at least one example. In such cases where there is an unequal number of rich and lean cylinders, various percentage amounts for the rich and lean cylinder operation are possible without departing from the scope of this disclosure, so long as the percentage used for the rich cylinders 902 and the lean cylinders 904 achieves stoichiometry at the completion of each engine cycle.

Figure 9B:
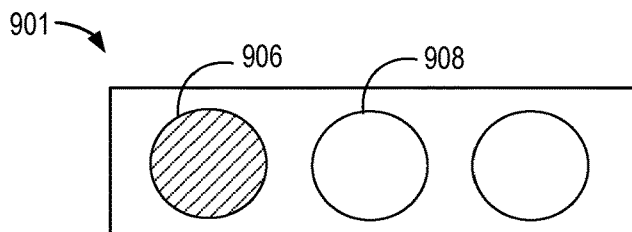
FIG. 9B shows a schematic illustration of a second default split lambda schedule according to at least one example of the present disclosure.

Turning now to FIG. 9B, a second default split lambda fueling schedule 901 is shown. The second default split lambda fueling schedule 901 is a one engine cycle schedule. In the second default split lambda fueling schedule 901, rich cylinders 906 are denoted via the circles with hatching and lean cylinders 908 are denoted via solid circles. The second default split lambda fueling schedule 901 is for a three cylinder engine. Due to the odd number of cylinders, and the requirement to maintain substantially stoichiometric conditions at the emission control device each cycle, the rich cylinders are unable to be operated at a same percentage rich as the lean cylinders are operated lean. Thus, in the second example default split lambda fueling schedule 901, it is noted that the rich cylinder 906 is operated at a percentage rich that is twice a percentage lean of each of the lean cylinders 908. By operating the rich cylinder 906 at a percentage rich twice the percentage lean of each of the lean cylinders 908, overall stoichiometry is achieved at the completion of the engine cycle. Alternative fueling ratios are also possible, however. For example, in at least one example, there may be two rich cylinders 906 at 15% rich and one lean cylinder 908 operated at 30% lean. Other variations as to the fueling ratios are also possible without departing from the scope of this invention, so long as there is at least one non-stoichiometric cylinder and overall the fueling schedule 901 maintains substantially stoichiometric conditions at the emission control device. Further, in at least one example, the cylinders shown at FIG. 9B may be a first cylinder bank of a two cylinder bank configuration. In such examples where the cylinders shown at FIG. 9B may be a first cylinder bank of a two cylinder bank configuration, the second cylinder bank would also be operated at overall stoichiometry.

Figure 9C:
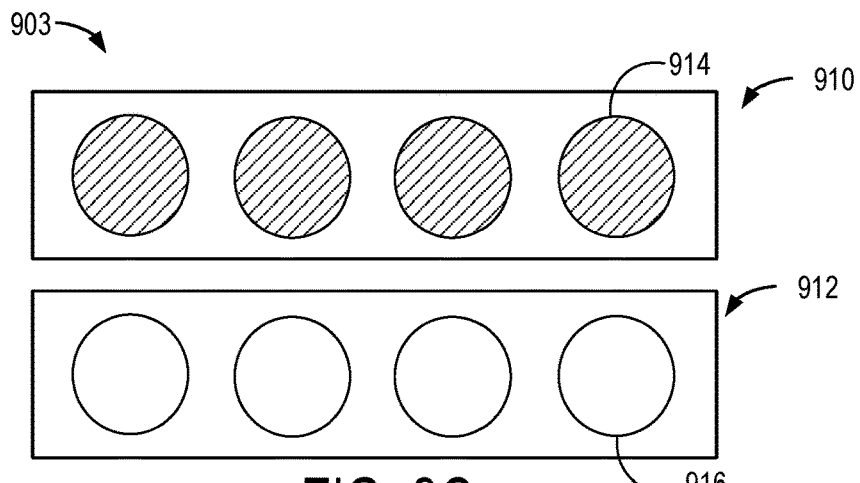
FIG. 9C shows a schematic illustration of a third default split lambda schedule according to at least one example of the present disclosure.

Moving now to FIG. 9C, a third default split lambda fueling schedule 903 is shown. The third default split lambda fueling schedule 903 is a one engine cycle schedule. Thus, the third default split lambda fueling schedule 903 schematically illustrates operation of a first engine cylinder bank 910 and a second engine cylinder bank 912 for a single engine cycle. In the third example default split lambda fueling schedule 903, each cylinder of the first engine cylinder bank 910 is a rich cylinder 914 and each cylinder of the second engine cylinder bank 912 a lean cylinder 916. It is noted that reference to rich cylinders herein refers to cylinders which are operated at an AFR rich of stoichiometry. However, variations as to the fueling operations for the first engine cylinder bank 910 and the second engine cylinder bank 912 are possible, so long as the percentage rich of the first engine cylinder bank 910 is equal to the percentage lean of the second engine cylinder bank 912. For example, if the first engine cylinder bank 910 is operated at 20% rich overall for each engine cycle, then the second engine cylinder bank 912 is operated at 20% lean overall for each engine cycle. In this way, substantially stoichiometric conditions are maintained at the emission control device while achieving cooling advantages due to the non-stoichiometric operation of the engine. Alternatively, for configurations where the engine comprises a first engine cylinder bank 910 with four cylinders and a second engine cylinder bank 912 with four cylinders, each of the first and second engine cylinder banks may be fueled in accordance with the approach described in relation to FIG. 9A. That is, each of the first engine cylinder bank 910 and the second engine cylinder bank 912 may be operated stoichiometrically.

Figure 9D:
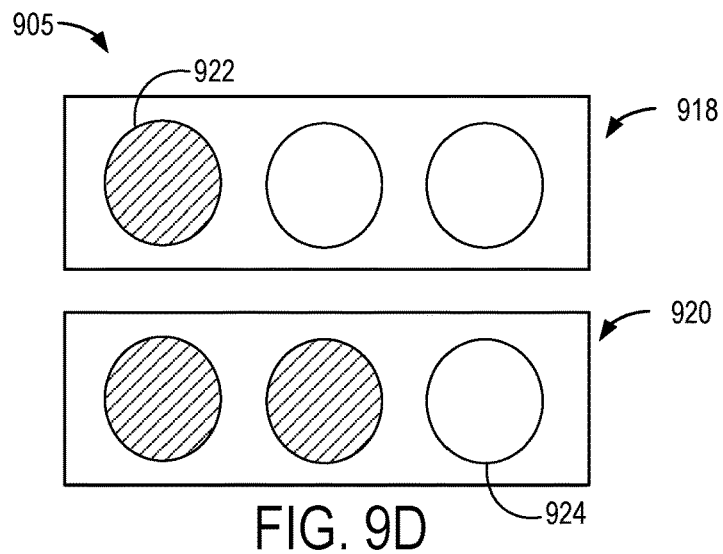
FIG. 9D shows a schematic illustration of a fourth default split lambda schedule according to at least one example of the present disclosure.

Turning now to FIG. 9D, a fourth default split lambda fueling schedule 905 is shown. The fourth default split lambda fueling schedule 905 is a one engine cycle schedule. Thus, the fourth default split lambda fueling schedule 905 schematically illustrates operation of a first engine cylinder bank 918 and a second engine cylinder bank 920 for a single engine cycle. In the fourth example default split lambda fueling schedule 905, rich cylinders 922 are operated at a same percentage rich as the lean cylinders 924 are operated lean. Thus, the first engine cylinder bank 918 is enleaned at an amount equal to an amount the second engine cylinder bank 920 is enriched. Such a fueling schedule results in each overall engine cycle of the fourth default split lambda fueling schedule 905 being stoichiometric. For example, the rich cylinders 922 may be operated at 10% rich (a phi value of 1.10) and the lean cylinders 924 may be operated at 10% lean (a phi value of 0.90) in the fourth default split lambda fueling schedule 905. In such examples, the first cylinder bank 918 would be overall be enleaned by 3.3% (a phi value of 0.967) and the second cylinder bank 920 would overall be enriched by 3.3% (a phi value of 1.033). Thus, for each engine cycle in the fourth default split lambda fueling schedule 905, stoichiometric conditions are advantageously maintained at the emission control device while still benefitting from cooling properties of carrying out non-stoichiometric cylinder operation.

Turning back to step 514 at FIG. 5, after operation of the engine in the default split lambda mode (such as shown at FIGS. 9A-9D) method 500 may end.

Moving now to step 508, should dual fuel injection not be available ("NO"), method 500 includes determining whether the engine is operating with rolling split lambda mode conditions at step 516. Rolling split lambda mode conditions may be engine operating conditions during which the rolling split lambda mode is optimal for NVH and/or exhaust temperature reduction. Put another way, responsive to determining that only DI is available or that only PFI is available, method 500 moves to step 516. In some examples, dual fuel injection may be determined as unavailable at step 508 if any of the cylinders do not have one of DI or PFI available. In some examples, such availability may be based on a diagnostic routine for each of the DI injectors and the PFI injectors to determine functionality of the injectors. It is noted that the dual fuel injection may be determined as unavailable responsive to a diagnostic indicating that only one of DI injectors (e.g., direct injectors 66) and PFI injectors (e.g., port fuel injectors 67) are available for all of the cylinders. Additionally or alternatively, the availability may be based on a fuel availability for each of the DI injectors and the PFI injectors in configurations where a fuel source for each of the DI injectors and the PFI injectors may be separate.

At step 516, the determination as to whether the engine is operating in the rolling split lambda conditions is as described at step 510. As described above, the rolling split lambda conditions are engine operating conditions in which the rolling split lambda mode is optimal for NVH and/or exhaust temperature reduction. If the engine is operating in the rolling split lambda conditions at step 516 ("YES"), method 500 includes operating the engine in the rolling split lambda mode with PFI or DI for all of the cylinders. That is, the engine may simultaneously benefit from operating in rolling split lambda mode while dual fuel injection is not available in order for method 500 to carry out step 518.

At step 518, whichever type of injection is the only injection available (only DI or only PFI) is used for all cylinders at step 518 in the rolling split lambda mode. Thus, regardless of whether the cylinders are operated rich or lean, only one of DI or PFI is used for all of the cylinders at step 518. Aside from using either all DI via the direct injectors or all PFI via the port fuel injectors, step 518 is carried out in a similar manner as step 512. That is, similar fuel schedules (FIGS. 8A-8D) and other controls as discussed at step 512 may be used at step 518, with the exception that only DI or only PFI is used. Following step 518, method 500 may end.

Turning back to step 516, responsive to determining that the engine is not operating in rolling split lambda conditions (that is, the rolling split lambda mode is not optimal for NVH and/or exhaust temperature reduction) ("NO") at step 516, method 500 includes operating the engine default split lambda mode either PFI or DI for all of the cylinders at step 520. That is, to carry out step 520, the engine operating conditions are such that operation in the rolling split lambda mode would not be beneficial while simultaneously dual fuel injection is not available. Similar to step 518, regardless of whether the cylinders are operated rich or lean, whichever type of injection is the only injection available (only DI or only PFI) is used for the cylinders at step 520. Aside from using either all DI via the direct injectors or all PFI via the port fuel injectors to perform fueling, step 520 is carried out in a similar manner as step 514. That is, similar fuel schedules (FIGS. 9A-9D) and other controls as discussed at step 514 may be used at step 520, with the exception that only DI or only PFI is used. Following step 520, method 500 may end.

Moving now to FIG. 10A and FIG. 10B, an example speed-load map 1000 and an example timeline 1002 are shown. Speed-load map 1000 may be stored on the engine controller for use during engine operation. Timeline 1002 illustrates example transitions between operation in the stoichiometric, default split lambda, and rolling split lambda modes based on speed-load map 1000. As the speed-load map 1000 and the example timeline 1002 are interrelated, both FIG. 10A and FIG. 10B are described herein together.

As shown at FIG. 10A, the speed-load map 1000 relates engine speed and load. Engine speed (RPM) increases in a direction of the x-axis arrow and the engine load increases in the direction of the y-axis arrow. Regions labeled II, IV, VI, and VIII of speed-load map 1000, which are filled with a hatch pattern, correspond to speed-load conditions in which a rolling split lambda operating mode is carried out. Regions II, IV, VI, and VIII of speed-load map 1000 form the regions where the stoichiometric mode results in excessive exhaust temperatures, and the rolling split lambda mode is more effective compared to the default split lambda for NVH and exhaust temperature reduction. Regions labeled III, V, and VII of speed-load map 1000, which are filled with a dot pattern, correspond to speed-load conditions in which a default split lambda operating mode is carried out. Region labeled I of speed-load map 1000, which is filled with a vertical stripe pattern, represents speed-load conditions in which a stoichiometric operating mode is carried out. Thus, each of the regions of FIG. 10A represent a set of engine operating conditions and engine operating modes to be carried out responsive various engine operating conditions. In at least one example, the regions may be determined based on which engine operating mode is most effective to reduce NVH and/or exhaust temperature while still satisfying torque demands.

As may be seen in FIG. 10A, at loads above a load threshold 1028 at the upper boundary of region I, the rolling split lambda operating mode or the default split lambda mode is used. Load threshold 1028 also divides the rolling split lambda and the default split lambda modes from one another. That is, 1028 is not just the upper boundary of region I but includes all of the heavy lines within the speed-load map 1000 at FIG. 10A to divide the regions from one another. Put another way, load threshold 1028 is represented by the heavy lines extending between regions I, II, III, IV, V, VI, VII, and VIII of speed-load map 1000. The upper boundary of region I correspond to the torque threshold in 504, while the boundaries splitting the default and rolling split lambda regions determine the outcome of 510 and 516.

Load threshold 1028 is dynamically updated based on speed. That is, load threshold 1028 is not static. For example, the load threshold 1028 between region I and region II of speed-load map 1000 is higher than the load threshold 1028 at between region I and region III of speed-load map 1000. Though the load threshold 1028 is shown to change substantially at different engine speeds, in at least one examples, the load threshold 1028 may be gradually changed as the engine speed changes.

It is noted that the regions illustrated in speed-load map 1000 are exemplary and may be tuned to individual driveline configurations. In at least one example, the speed-load map 1000 may act as a reference map which is adjusted based on feedback during operation. For example, the speed-load map 1000 may be stored at factory settings and then may be adjusted responsive to feedback from sensors, such as sensors indicating NVH, based on engine operation. By adjusting the speed-load map 1000 based on feedback from sensors during engine operation, the speed-load map 1000 may improve efficiency of the engine operation in different environmental conditions and variance in the driveline configuration. In at least one example, the load threshold 1028 separating a default split lambda from a rolling split lambda region may be decreased responsive to determining that NVH greater than a threshold NVH occurs at an engine speed where default split lambda or rolling split lambda operating modes are set to be carried out.

Additionally or alternatively, a testing mode may be periodically carried out to determine whether or not the load threshold 1028 may be increased. In at least one example, the increase of the load threshold 1028 may not exceed load and speed conditions confirmed to result in NVH greater than the threshold NVH responsive to the testing mode results.

In at least one example, the threshold separating stoichiometric operation mode from one of the split lambda modes (e.g., the default split lambda mode and the rolling split lambda mode) may be changed based on exhaust temperature considerations. For example, the threshold separating stoichiometric operation from one of the split lambda modes may be adjusted to ensure that engine operation maintains exhaust temperatures less than a threshold exhaust temperature. The threshold exhaust temperature may be a temperature at which it is determined degradation of one or more exhaust components may occur. In one or more examples, the threshold separating stoichiometric operation mode from any of the split lambda modes may be changed based on exhaust temperature considerations and not NVH.

Turning now to time t1004 of FIG. 10B, t1004 corresponds to operation of the engine in a first condition that is in region I of the speed-load map 1000. Dual fueling 1024 is further available at time t1004.

Responsive determining that the engine is being operated in the first condition within region I while dual fueling 1024 is available, the engine is operated in the stoichiometric operating mode without dual fueling, as seen at operating mode trace 1020 and dual fueling operation trace 1022. Such operation may be carried out from time t1004 to t1006. By operating the engine in the stoichiometric mode responsive to the first condition that is in region I, emissions may be avoided and engine performance may be maintained with a reduced risk of overheating the engine components.

At time t1006, the engine is operated in a second condition that is in region III of the speed-load map 1000. In particular, an engine speed and load increases from t1004 to t1006, such that the engine is operated in region III. For example, the speed of the engine is increased responsive to an increase in torque demand to be greater than the threshold torque demand. The second condition in region III thus includes operation of the engine at a speed and load which is higher than the speed of the first condition in region I. The dual fueling availability trace 1026 indicates that dual fueling is still available at time t1006. In at least one example, dual fueling availability may be determined in a similar manner as discussed at step 508 of method 500. Thus, as seen at t1006 of FIG. 10B, the engine is operated in the default split lambda mode from t1006 to t1008 with dual fueling operation, as indicated by dual fueling operation trace 1022. In at least one example, the default split lambda operating mode at time t1006 may correspond to the default split lambda mode at step 514 of method 500. By operating in the default split lambda mode at time t1006 during the second condition that is in region III, substantially stoichiometric conditions may be achieved at an emission control device of the engine while maintaining engine performance and avoiding overheating of engine components.

At time t1008, the engine is operated in a third condition that is in region IV of the speed-load map 1000. During the third condition in region IV at time t1008, a speed of the engine is greater than at time t1006. Further, a load at the third condition in region IV may be less than the load of the second condition in region III. This decrease in load may be due to driving the vehicle downhill, in at least one example. It is noted that dual fueling is available as indicated by dual fueling availability trace 1024. Responsive determining that the engine is being operated in the third condition in region IV at time t1008 with dual fueling available, the rolling split lambda operating mode is carried out with dual fueling operation, as seen at operating mode trace 1020 and dual fuel operation trace 1022 of FIG. 10B. In at least one example, the rolling split lambda operating mode at time t1008 may correspond to the rolling split lambda mode at step 512 of method 500. By operating in the rolling split lambda mode at time t1008 as seen at trace 1020, amplification due to resonance may be reduced by carrying out non-stoichiometric engine cycles to alter the driveline frequency. That is, rolling split lambda mode operation may advantageously alter the fuel schedule frequency to avoid the resonant frequency while maintaining substantially stoichiometric conditions at an emission control device of the engine.

Following time t1008 and the third condition in region IV, the engine is operated in a fourth condition at time t1010. In the fourth condition in region VI, a load of the engine is further increased and a speed of the engine increases. In at least one example, the increase in load may be due to a steepness of a hill the vehicle is driving up increasing. At the fourth condition in region VI, the torque demand is still greater than the threshold torque demand. Looking to time t1010 of FIG. 10B, the dual fueling availability trace 1024 indicates that dual fueling is still available.

Responsive operation of the engine in the fourth condition in region VI at time t1010, the rolling split lambda operating mode continues to be carried out with dual fueling operation, as seen at operating mode trace 1020 and dual fuel operation trace 1022 of FIG. 10B. Thus, the advantages and operating action of the engine in the fourth condition in region VI at time t1010 are similar to the advantages and operating actions from the third condition in region IV at time t1008.

After time t1010 and the fourth condition in region VI, the engine is operated in a fifth condition in region V at time t1012. In the fifth condition in region V, a load of the engine is maintained while an engine speed is decreased. Thus, at the fifth condition in region V, the torque demand is still greater than the threshold torque demand. As a result of the operation in region V, the engine is operated without exciting the resonant frequency that may cause NVH of the driveline to exceed the NVH threshold. Further, looking to time t1012 of FIG. 10B, the dual fueling availability trace 1026 indicates that dual fueling is still available.

Responsive determining that the engine is being operated in fifth condition in region V at time t1012, the default split lambda operating mode is carried out with dual fueling operation, as seen at operating mode trace 1020 and dual fuel operation trace 1022 of FIG. 10B. In at least one example, the default split lambda operating mode at time t1012 may correspond to the default split lambda at step 514 of method 500. By operating in the default split lambda mode at time t1012, substantially stoichiometric conditions may be achieved at an emission control device of the engine while maintaining engine performance and avoiding overheating of engine components.

After time t1012 and the fifth condition in region V, the engine is operated in a sixth condition in region VII at time t1014. In the sixth condition in region VII, a speed of the engine may be substantially increased and a load decreased from the fifth condition in region V, for example. In at least one example, the sudden jump in speed from V to VII may be due to a down-shift. Looking to time t1014 of FIG. 10B, the dual fueling availability trace 1024 indicates that dual fueling is no longer available. Determination as to a lack of dual fueling availability may correspond to step 508 of method 500, in at least one example.

Responsive determining that the engine is being operated in the sixth condition region VII at time t1014, the default split lambda operating mode is carried out without dual fueling operation, as seen at operating mode trace 1020 and dual fuel operation trace 1022 of FIG. 10B. That is, responsive to being operated in region VII without dual fueling available, the default split lambda operating mode is carried out without dual fueling operation at time t1014. In at least one example, the default split lambda operating mode at time t1014 may correspond to the default split lambda mode at step 520 of method 500. By operating in the default split lambda mode at time t1014 during the sixth condition in region VII, substantially stoichiometric conditions may be achieved at an emission control device of the engine while maintaining engine performance and avoiding overheating of engine components.

Following time t1014 and the sixth condition in region VII, the engine is operated in a seventh condition in region VIII at time t1016. In the seventh condition in region VIII, a speed of the engine is substantially similar to the sixth condition in region VII. However, in contrast to the sixth condition in region VII, the engine load is increased to be greater than or equal to load threshold 1028 shown between region VII and region VIII in the seventh condition. As a result, NVH may increase above the NVH threshold if engine operation is not adjusted. Further, looking to time t1018 of FIG. 10B, the dual fueling availability trace 1026 indicates that dual fueling is not available at time t1018.

Responsive determining that the engine is being operated in seventh condition in region VIII at time t1016, the rolling split lambda operating mode is carried out without dual fueling operation, as seen at operating mode trace 1020 and dual fuel operation trace 1022 of FIG. 10B. That is, responsive to being operated within region VIII, where dual fueling is not available, the rolling split lambda operating mode is carried out without dual fueling operation. In at least one example, the rolling split lambda operating mode at time t1016 may correspond to the rolling split lambda mode operation at step 518 of method 500. By operating in the rolling split lambda mode at time t1016 during seventh condition in region VIII, amplification due to resonance may be reduced by carrying out non-stoichiometric engine cycles to alter the driveline frequency. That is, rolling split lambda mode operation may advantageously alter the driveline frequency to avoid NVH issues.

Following time t1016 and seventh condition in region VIII, the engine is operated in an eighth condition in region I at time t1018. In the eighth condition in region I, a speed and load of the engine is decreased to be less than the load threshold 1028 defining the upper boundary of region I. The eighth condition in region I includes operation of the engine at a speed similar to the engine speed of first condition in region I. In at least one example, the load of eighth condition in region I may be substantially the same as the load of the seventh condition in region VIII. Looking to time t1018 of FIG. 10B, the dual fueling availability trace 1024 indicates that dual fueling is not available at time t1018.

Responsive determining that the engine is being operated in the eighth condition in region I at time t1018, the stoichiometric operating mode is carried out without dual fueling operation, as seen at operating mode trace 1020 and dual fuel operation trace 1022 of FIG. 10B. That is, responsive to being operated with the torque demand less than a threshold torque demand defining the upper boundary of region I, where dual fueling is not available, the stoichiometric operating mode is carried out without dual fueling operation. In at least one example, the stoichiometric operating mode at time t1018 may correspond to the stoichiometric mode operation discussed at step 506 of method 500. By operating the engine in the stoichiometric mode responsive to the eighth condition in region I at time t1018, emissions may be avoided and engine performance may be maintained with a reduced risk of overheating the engine components.

Thus, provided herein are systems and methods for carrying out split lambda fueling operations for an engine to address issues such as NVH due at least in part to split lambda fuel schedules exciting engine resonant frequencies. In at least one example, the rolling split lambda mode may be used instead of default split lambda mode during a condition where split lambda operation enables higher torques. Thus, the rolling split lambda mode may be carried out during one or more of the following conditions: a rolling split lambda fueling schedule is predicted to improve NVH compared to the default split lambda mode, and the rolling split lambda mode enables higher engine torques than the default split lambda mode.

An example method includes, while operating an engine in a condition that is within a resonant frequency region for a default split lambda mode, carrying out a rolling split lambda mode, wherein the engine is operated with only stoichiometric engine cycles in the default split lambda mode, the stoichiometric engine cycles including enleaned and enriched cylinders, wherein the engine is operated with a plurality of non-stoichiometric engine cycles when carrying out the rolling split lambda mode, the plurality of non-stoichiometric engine cycles including at least one rich engine cycle and at least one lean engine cycle. In a first example of the method, the condition includes a torque command greater than a threshold torque demand. In a second example of the method, which optionally includes the first method, the plurality of non-stoichiometric engine cycles are part of a predetermined number of engine cycles, and wherein the predetermined number of engine cycles result in overall stoichiometric conditions at the emission device of the engine. In a third example of the method, which optionally includes one or both of the first and second examples, the resonant frequency region of the default split lambda mode is an operating region of the engine in which an amount of NVH is greater than a predetermined NVH threshold when carrying out the default split lambda mode. In a fourth example of the method, which optionally one or more of the first through third examples, the rolling split lambda mode has a higher torque output potential than the default split lambda mode while operating the engine in the condition. In a fifth example of the method, which optionally includes one or more of the first through fourth examples, while operating the engine outside of the resonant frequency region of the default split lambda mode with a torque demand greater than a threshold torque demand, the fifth example of the method includes carrying out the default split lambda mode in which every engine cycle is stoichiometric. In a sixth example of the method, which optionally includes one or more of the first through fifth examples, carrying out the default split lambda mode includes non-stoichiometric operation of one or more cylinders of the engine.

In a further method, which optionally includes one or more features of the above-discussed method, the method comprises operating an engine in a condition where one or more of a potential torque output of a default split lambda mode is less than a potential torque output of a rolling split lambda mode, and operation in the default split lambda mode is determined to cause NVH greater than a threshold; and while operating the engine in the condition, carrying out the plurality of non-stoichiometric engine cycles in the rolling split lambda mode, wherein the engine is operated with only stoichiometric engine cycles in the default split lambda mode, the stoichiometric engine cycles including enleaned and enriched cylinders wherein the engine is operated with a plurality of non-stoichiometric engine cycles when carrying out the rolling split lambda mode, the plurality of non-stoichiometric engine cycles including at least one rich engine cycle and at least one lean engine cycle. In a first example of the method, the condition includes an engine torque demand that is greater than a threshold torque demand. In a second example of the method, which optionally includes the first example, the engine is operated within a resonant frequency region for the default split lambda mode in the condition. In a third example of the method which optionally includes one or both of the first and second methods, the third example of the method further comprises operating the engine in a further condition where the engine torque demand is less than the threshold torque demand, and operating all cylinders of the engine at stoichiometry in a stoichiometric mode during the further condition. In a fourth example of the method, which includes one or more of the first through third examples, a different fueling schedule is used to deliver fuel to cylinders of the engine in the default split lambda mode than in the rolling split lambda mode.

An example system, which may include a controller configured to carry out one or more of the above-discussed methods, comprises an engine, wherein the engine includes a plurality of cylinders; a plurality of fuel injectors coupled to the engine; an emission control device positioned downstream of an exhaust manifold of the engine; a controller with computer readable instructions stored on non-transitory memory that, when executed during engine operation, cause the controller to: calculate a first potential torque output of a default split lambda mode, wherein the engine is operated with only stoichiometric engine cycles in the default split lambda mode, the stoichiometric engine cycles including enleaned and enriched cylinders of the plurality of cylinders; calculate a second potential torque output of a rolling split lambda mode, wherein the rolling split lambda mode includes carrying out a plurality of non-stoichiometric engine cycles; and carry out the plurality of non-stoichiometric engine cycles via the rolling split lambda mode responsive to the second potential torque output being greater than the first torque output. It is noted that the system may include instructions in the controller to carry out one or more of the steps discussed above in the example method, as well as any further example methods discussed herein. In a first example of the system, the instructions further cause the controller to carry out the plurality of non-stoichiometric engine cycles via the rolling split lambda mode responsive to the engine being operated in a condition which is determined to cause greater than a threshold amount of NVH if the engine is operated in the default split lambda mode. In a second example of the system, which optionally includes the first example, the engine is determined to be operating within the condition which causes greater than the threshold amount of NVH based on a speed and a load of the engine. In a third example of the system, which includes one or both of the first and second examples, carrying out the plurality of non-stoichiometric engine cycles via the rolling split lambda mode includes carrying out at least one lean engine cycle and at least one rich engine cycle. In a fourth example of the system, which optionally includes one or more of the first through third examples, a different fueling schedule is used to deliver fuel to the plurality of cylinders of the engine in the default split lambda mode than in the rolling split lambda mode. In a fifth example of the system, which optionally includes one or more of the first through fourth examples, completion of the plurality of non-stoichiometric engine cycles in the rolling split lambda mode results in substantially stoichiometric conditions at the emission control device. In a sixth example of the system which optionally includes the first through fifth examples, the sixth example system further comprises a first exhaust manifold and a second exhaust manifold, wherein the first exhaust manifold and the second exhaust manifold are coupled to different cylinders of the plurality of cylinders. In a seventh example of the system, which optionally includes one or more of the first through sixth examples, the first exhaust manifold and the second exhaust manifold are upstream a turbine of the engine, and wherein the first exhaust manifold and the second exhaust manifold combine upstream of the turbine via a junction. In an eighth example of the system, which optionally includes one or more of the first through seventh examples, a singular passage extends from downstream the junction to the turbine, and wherein the emission control device is positioned downstream the turbine.

Additionally, provided herein are methods and systems for calculating torque outputs in a split lambda mode, such as the split lambda modes discussed above. For example, a method comprises, via a controller, operating an engine with one or more non-stoichiometric cylinders of a plurality of cylinders; calculating a stoichiometric torque output of the plurality of cylinders; then applying one or more lean torque modifiers for every lean cylinder of the one or more non-stoichiometric cylinders to the stoichiometric torque output to calculate a lean torque output; separately applying one or more rich torque modifiers for every rich cylinder of the one or more non-stoichiometric cylinders to the stoichiometric torque output to calculate a rich torque output; summing the lean torque output and the rich torque output to calculate a total engine torque output; comparing the total engine torque output to a desired torque output; and adjusting one or more of an amount of fuel delivered to the plurality of cylinders and spark timing based on the comparison. In a first example of the method, applying the one or more lean torque modifiers to every lean cylinder includes applying the one or more lean torque modifiers to every lean cylinder individually, and adjusting the one or more lean torque modifiers prior to the individual application of the one or more lean torque modifiers, the one or more lean torque modifiers adjusted based one or more parameters of the lean cylinder to which the one or more lean torque modifiers are being applied. In a second example of the method, which optionally includes the first method, the one or more parameters of the lean cylinder include an air-fuel-ratio of the lean cylinder. In a third example of the method, which optionally includes one or both of the first and second methods, calculating the total engine torque output includes grouping the one or more non-stoichiometric cylinders into a rich cylinder group and a lean cylinder group, wherein applying the one or more lean torque modifiers for every lean cylinder includes applying the one or more lean torque modifiers to the lean cylinder group to form a lean cylinder group torque output, and wherein applying the one or more rich torque modifiers for every rich cylinder includes applying the one or more rich torque modifiers to the rich cylinder group to form a rich cylinder group torque output. In a fourth example of the method, which optionally includes one or more of the first through third methods, summing the lean torque output and the rich torque output to calculate the total engine torque output includes summing the rich cylinder group torque output and the lean cylinder group torque output. In a fifth example of the method, which optionally includes one or more of the first through fourth examples, the one or more rich torque modifiers includes one or more of a rich cylinder group spark timing and a rich cylinder group air-fuel-ratio, and where the one or more lean torque modifiers includes one or more of a lean cylinder group spark timing and a lean cylinder group air-fuel-ratio, wherein each of the one or more non-stoichiometric cylinders of the rich cylinder group has a same amount of rich bias, and wherein each of the one or more non-stoichiometric cylinders of the lean cylinder group has a same amount of lean bias. In a sixth example of the method, which optionally includes one or more of the first through fifth examples, adjusting the amount of fuel delivered to the plurality of cylinders includes adjusting actuation of one or more fuel injectors of the engine, and wherein adjusting the spark timing includes adjusting actuation of one or more spark plugs of the engine.

In an example, a system comprises an engine, wherein the engine includes a plurality of cylinders; a plurality of fuel injectors coupled to the engine; a controller with computer readable instructions stored on non-transitory memory that, when executed during engine operation, cause the controller to: operate an engine with one or more non-stoichiometric cylinders of a plurality of cylinders; calculate a stoichiometric torque output of the plurality of cylinders; then apply one or more lean torque modifiers for every lean cylinder of the one or more non-stoichiometric cylinders to the stoichiometric torque output to calculate a lean torque output; separately apply one or more rich torque modifiers for every rich cylinder of the one or more non-stoichiometric cylinders to the stoichiometric torque output to calculate a rich torque output; sum the lean torque output and the rich torque output to calculate a total engine torque output; compare the total engine torque output to a desired torque output; and adjust one or more of an amount of fuel delivered to the plurality of cylinders and spark timing based on the comparison. It is noted that the system may include instructions in the controller to carry out one or more of the steps discussed above in the example method, as well as any further example methods discussed herein. In a first example of the system, the instructions further cause the controller to, in response to carrying out a rolling split lambda mode, apply the one or more lean torque modifiers to every lean cylinder individually, and adjust the one or more lean torque modifiers prior to the individual application of the one or more lean torque modifiers, the one or more lean torque modifiers adjusted based one or more parameters of the lean cylinder to which the one or more lean torque modifiers are being applied, wherein the rolling split lambda mode includes carrying out a plurality of non-stoichiometric engine cycles. In a second example of the system, which optionally includes the first example, the instructions further cause the controller to, in response to carrying out the rolling split lambda mode, apply the one or more rich torque modifiers to every rich cylinder individually, the one or more rich torque modifiers adjusted prior to the individual application of the one or more rich torque modifiers, the one or more rich torque modifiers adjusted based on one or more parameters of the rich cylinder to which the one or more rich torque modifiers are being applied. In a third example of the system, which optionally includes one or both of the first and second examples, the one or more parameters of the lean cylinder and the one or more parameters of the rich cylinder include an air-fuel-ratio. In a fourth example of the system which optionally includes one or more of the first through third examples, the fourth example further comprises one or more lean torque modifiers for every lean cylinder and applying one or more rich torque modifiers for every rich cylinder includes applying the one or more lean torque modifiers to a lean cylinder group to calculate a lean cylinder group torque output, and applying the one or more rich torque outputs to a rich cylinder group to calculate a rich cylinder group torque output. In a fifth example of the system, which optionally includes one or more of the first through fourth examples, summing the lean torque output and the rich torque output to calculate the total engine torque output includes summing the lean cylinder group torque output and the rich cylinder group torque output. In a sixth example of the system, which optionally includes one or more of the first through fifth examples, the one or more lean torque modifiers include one or more of a spark timing torque modifier and an air-fuel-ratio torque modifier.

In a further method, which may include one or more of the above-discussed features, the comprises, via a controller, operating an engine with one or more non-stoichiometric cylinders of a plurality of cylinders; calculating an average cylinder torque output based on a current engine speed, a current engine load, a current variable cam timing (VCT), and a total number of the plurality of cylinders; then applying one or more lean torque modifiers to the average cylinder torque output for each lean cylinder of the one or more non-stoichiometric cylinders to calculate a lean cylinder torque output; applying one or more rich torque modifiers to the average cylinder torque output for each rich cylinder of the one or more non-stoichiometric cylinders to calculate a rich cylinder torque output, calculating a total engine torque output based on the lean cylinder torque output and the rich cylinder torque output; comparing the total engine torque output to a desired torque output; and adjusting one or more of an amount of fuel delivered to the plurality of cylinders and spark timing based on the comparison. In a first example of the method, values associated with the one or more lean torque modifiers are based on a lambda value of the lean cylinders of the one or more non-stoichiometric cylinders. In a second example of the method, which optionally includes the first example, values associated with the one or more rich torque modifiers are based on a lambda value of the rich cylinders of the one or more non-stoichiometric cylinders. In a third example of the method, which optionally includes one or both of the first and second examples, applying the one or more lean torque modifiers includes applying includes applying a lean air-fuel-ratio torque modifier value to the lean cylinders of the one or more non-stoichiometric cylinders, and wherein applying the one or more rich torque modifiers includes applying a rich air-fuel-ratio torque modifier value to the rich cylinders of the one or more non-stoichiometric cylinders. In a fourth example of the method, which optionally includes one or more of the first through third examples, all the lean cylinders are grouped separately from all the rich cylinders prior to applying the lean air-fuel-ratio torque modifier and the rich air-fuel-ratio torque modifier. In a fifth example of the method, which optionally includes one or more of the first through fourth examples, applying the one or more lean torque modifiers and applying the one or more rich torque modifiers includes individually applying an air-fuel-ratio torque modifier value to each of the one or more non-stoichiometric cylinders.

Additionally or alternatively, described herein are systems and methods for operating the engine with PFI and DI, such as during the split lambda mode. A first example of the method comprises while operating an engine with at least one lean cylinder and at least one rich cylinder delivering fuel to the at least one lean cylinder via direct fuel injection (DI) and delivering fuel to the at least one rich cylinder via port fuel injection (PFI). In a second example, which optionally includes the first example, the method further comprises transitioning the at least one rich cylinder fueled via PFI to instead be operated at stoichiometry, and fueling the at least one rich cylinder transitioned to be operated at stoichiometry via DI. In a third example of the method, which optionally includes one or both of the first and second examples, the at least one rich cylinder is transitioned responsive to a torque demand decreasing from above a threshold torque demand to below the threshold torque demand. In a fourth example of the method, which optionally includes one or more of the first through third examples, the fourth example includes performing a PFI and DI diagnostic, determining that PFI is not available, and then fueling both the at least one lean cylinder and the at least one rich cylinder via DI. In a fifth example of the method, which optionally includes one or more of the first through fourth examples, the engine is operated with the at least one lean cylinder and the at least one rich cylinder responsive to a torque demand greater than a threshold torque demand. In a sixth example of the method, which optionally includes one or more of the first through fifth examples, operating the engine with the at least one lean cylinder and the at least one rich cylinder includes operating the engine in a rolling split lambda mode, where the rolling split lambda mode includes carrying out a plurality of non-stoichiometric engine cycles. In a seventh example of the method, which optionally includes one or more of the first through fifth examples, operating the engine with the at least one lean cylinder and the at least one rich cylinder includes operating the engine in a default split lambda mode, where the default split lambda mode includes only carrying out stoichiometric engine cycles. In an eighth example of the method, which optionally includes the first through seventh examples, DI is carried out via direct fuel injectors, and wherein PFI is carried out via port fuel injectors which are different than the direct fuel injectors.

An example system is further disclosed which includes, an engine including a plurality of cylinders; a plurality of direct injectors, each direct injector coupled to one of the plurality of cylinders; a plurality port fuel injectors, each port fuel injector coupled upstream of each of the plurality of cylinders; and a controller with computer readable instructions stored on non-transitory memory that, when executed during engine operation, cause the controller to: while operating the plurality of cylinders with at least one rich cylinder and with at least one lean cylinder, delivering fuel to the at least one rich cylinder via the corresponding port fuel injectors and delivering fuel to the at least one lean cylinder via the corresponding direct fuel injectors. It is noted that the system may include instructions in the controller to carry out one or more of the steps discussed above in the example method, as well as any further example methods discussed herein. In a first example of the system, the computer readable instructions, when executed during engine operation, further cause the controller to: operate the plurality of cylinders at stoichiometry, and deliver fuel to the plurality of cylinders via the corresponding direct injectors. In a second example of the system, which optionally includes the first example, the plurality of cylinders are operated at stoichiometry responsive to a torque demand less than a threshold torque demand. In a third example of the system, which optionally includes one or both of the first and second examples, the plurality of cylinders are operated with the at least one rich cylinder and the at least one lean cylinder during operation in a rolling split lambda mode, wherein there are a plurality of non-stoichiometric engine cycles in the rolling split lambda mode, and wherein only stoichiometric engine cycles are carried out in a default split lambda mode. In a fourth example of the system, which optionally includes one or more of the first through third examples, the plurality of cylinders are operated with the at least one rich cylinder and the at least one lean cylinder during operation in the default split lambda mode. In a fifth example of the system, which optionally includes one or more of the first through fourth examples, the rolling split lambda mode is carried out responsive to one or more of operating the engine in a resonant frequency region of the default split lambda mode, and a potential torque of the rolling split lambda mode being greater than the potential torque of the default split lambda mode. In a sixth example of the system, which optionally includes one or more of the first through fifth examples, the engine is determined to be operated in the resonant frequency region of the default split lambda mode based on an engine speed and an engine load. In a seventh example of the system, which optionally includes one or more of the first through sixth examples, the computer readable instructions, when executed during engine operation, further cause the controller to: carry out a diagnostic for dual fuel injection, wherein the dual fuel injection is available responsive to both the direct injectors and the port fuel injectors being operable, and wherein the dual fuel injection is unavailable responsive to only one of the direct injectors and the port fuel injectors being operable; determine that the dual fuel injection is unavailable; and continue operating the plurality of cylinders with at least one rich cylinder and with at least one lean cylinder, delivering fuel to the at least one rich cylinder and to the at least one lean cylinder using port fuel injection.

In a further example a method comprises, while operating a plurality of cylinders of an engine with at least one rich cylinder and with at least one lean cylinder, delivering fuel to the at least one rich cylinder via port fuel injection (PFI) and delivering fuel to the at least one lean cylinder via direct fuel injection (DI); and determining that one of PFI and DI is no longer available, and delivering fuel to all of the cylinders via only PFI or only DI. In a first example of the method, operation of the plurality of cylinders with at least one rich cylinder and with at least one lean cylinder is responsive to a torque demand greater than a threshold torque demand. In a second example of the method, which optionally includes the first example, delivering the fuel to all of the cylinders via only PFI or only DI is carried out while still operating the plurality of cylinders with at least one rich cylinder and at least one lean cylinder. In a third example of the method, which optionally includes one or both of the first and second examples, the plurality of cylinders are operated with at least one rich cylinder and at least one lean cylinder responsive to a torque demand greater than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
while operating an engine in a condition that is within a resonant frequency region for a default split lambda mode and in which a rolling split lambda mode is calculated to reduce an exhaust temperature of the engine compared to the default split lambda mode, carrying out the rolling split lambda mode and reducing the exhaust temperature of the engine,
wherein the engine is operated with only stoichiometric engine cycles in the default split lambda mode, the stoichiometric engine cycles including enleaned and enriched cylinders, and
wherein the engine is operated with a plurality of non-stoichiometric engine cycles when carrying out the rolling split lambda mode, the plurality of non-stoichiometric engine cycles including at least one rich engine cycle and at least one lean engine cycle.

2. The method as claimed in claim 1, wherein the condition includes a torque command greater than a threshold torque demand.

3. The method of claim 2, wherein the plurality of non-stoichiometric engine cycles are part of a predetermined number of engine cycles, and wherein the predetermined number of engine cycles result in overall stoichiometric conditions at an emission device of the engine.

4. The method of claim 3, wherein the resonant frequency region of the default split lambda mode is an operating region of the engine in which an amount of NVH is greater than a predetermined NVH threshold when carrying out the default split lambda mode.

5. The method of claim 1, wherein the rolling split lambda mode has a higher torque output potential than the default split lambda mode while operating the engine in the condition.

6. The method of claim 1, further comprising:
while operating the engine outside of the resonant frequency region of the default split lambda mode with a torque demand greater than a threshold torque demand, carrying out the default split lambda mode in which every engine cycle is stoichiometric.

7. A method comprising:
operating an engine in a condition where one or more of a potential torque output of a default split lambda mode is less than a potential torque output of a rolling split lambda mode, and operation in the default split lambda mode is determined to cause NVH greater than a threshold; and
responsive to and while operating the engine in the condition, carrying out the plurality of non-stoichiometric engine cycles in the rolling split lambda mode and reducing an exhaust temperature of the engine,
wherein the engine is operated with only stoichiometric engine cycles in the default split lambda mode, the stoichiometric engine cycles including enleaned and enriched cylinders
wherein the engine is operated with a plurality of non-stoichiometric engine cycles when carrying out the rolling split lambda mode, the plurality of non-stoichiometric engine cycles including at least one rich engine cycle and at least one lean engine cycle.

8. The method of claim 7, wherein the condition includes an engine torque demand that is greater than a threshold torque demand.

9. The method of claim 8, wherein the engine is operated within a resonant frequency region for the default split lambda mode in the condition.

10. The method of claim 9, further comprising, operating the engine in a further condition where the engine torque demand is less than the threshold torque demand, and operating all cylinders of the engine at stoichiometry in a stoichiometric mode during the further condition.

11. The method of claim 7, wherein a different fueling schedule is used to deliver fuel to cylinders of the engine in the default split lambda mode than in the rolling split lambda mode.

12. A system, comprising:
an engine, wherein the engine includes a plurality of cylinders;
a plurality of fuel injectors coupled to the engine;
an emission control device positioned downstream of an exhaust manifold of the engine, wherein the emission control device comprises one or more of a catalyst brick and a particulate filter;
a controller with computer readable instructions stored on non-transitory memory that, when executed during engine operation, cause the controller to:
calculate a first potential torque output of a default split lambda mode, wherein the engine is operated with only stoichiometric engine cycles in the default split lambda mode, the stoichiometric engine cycles including enleaned and enriched cylinders of the plurality of cylinders;
calculate a second potential torque output of a rolling split lambda mode, wherein the rolling split lambda mode includes carrying out a plurality of non-stoichiometric engine cycles;
carry out the plurality of non-stoichiometric engine cycles via the rolling split lambda mode responsive to the second potential torque output being greater than the first potential torque output; and
carry out the plurality of non-stoichiometric engine cycles via the rolling split lambda mode and reducing an exhaust temperature of the engine responsive to the engine being operated in a condition which is determined to cause greater than a threshold amount of NVH if the engine is operated in the default split lambda mode.

13. The system of claim 12, wherein the engine is determined to be operating within the condition which causes greater than the threshold amount of NVH based on a speed and a load of the engine.

14. The system of claim 12, wherein carrying out the plurality of non-stoichiometric engine cycles via the rolling split lambda mode includes carrying out at least one lean engine cycle and at least one rich engine cycle.

15. The system of claim 14, wherein a different fueling schedule is used to deliver fuel to the plurality of cylinders of the engine in the default split lambda mode than in the rolling split lambda mode.

16. The system of claim 12, wherein completion of the plurality of non-stoichiometric engine cycles in the rolling split lambda mode results in substantially stoichiometric conditions at the emission control device.

17. The system of claim 12, further comprising a first exhaust manifold and a second exhaust manifold, wherein the first exhaust manifold and the second exhaust manifold are coupled to different cylinders of the plurality of cylinders.

18. The system of claim 17, wherein the first exhaust manifold and the second exhaust manifold are upstream a turbine of the engine, and wherein the first exhaust manifold and the second exhaust manifold combine upstream of the turbine via a junction.

19. The system of claim 18, wherein a singular passage extends from downstream the junction to the turbine, and wherein the emission control device is positioned downstream the turbine.

* * * * *